US009719589B2

(12) United States Patent
Depraete

(10) Patent No.: US 9,719,589 B2
(45) Date of Patent: Aug. 1, 2017

(54) HYDROKINETIC TORQUE CONVERTER WITHOUT IMPELLER AND TURBINE THRUST BEARINGS, AND METHOD FOR MAKING THE SAME

(71) Applicant: VALEO EMBRAYAGES, Amiens (FR)

(72) Inventor: Alexandre Depraete, Bloomfield, MI (US)

(73) Assignee: Valeo Embrayages (FR)

( * ) Notice: Subject to any disclaimer, the term of this patent is extended or adjusted under 35 U.S.C. 154(b) by 87 days.

(21) Appl. No.: 14/942,602

(22) Filed: Nov. 16, 2015

(65) Prior Publication Data

US 2017/0138455 A1    May 18, 2017

(51) Int. Cl.
F16H 45/02 (2006.01)
F16H 41/26 (2006.01)
F16H 41/28 (2006.01)

(52) U.S. Cl.
CPC ............ *F16H 45/02* (2013.01); *F16H 41/26* (2013.01); *F16H 2041/285* (2013.01); *F16H 2045/0226* (2013.01); *F16H 2045/0236* (2013.01)

(58) Field of Classification Search
CPC .......... F16D 33/18; F16D 33/20; F16H 41/26; F16H 41/2041; F16H 41/246; F16H 41/285; F16H 45/02; F16H 2045/0215; F16H 2045/0226; F16H 2045/0231; F16H 2045/0236; F16H 2045/0278; F16H 2045/0289

USPC ........................................................ 60/361
See application file for complete search history.

(56) References Cited

U.S. PATENT DOCUMENTS

| | | |
|---|---|---|
| 3,118,279 A | 1/1964 | Goudy |
| 2014/0097055 A1 | 4/2014 | Lindemann et al. |
| 2015/0068857 A1 | 3/2015 | Lindemann et al. |

FOREIGN PATENT DOCUMENTS

| | | |
|---|---|---|
| FR | 2204274 A5 | 5/1974 |
| GB | 1440134 A | 6/1976 |

OTHER PUBLICATIONS

International Search Report dated Apr. 6, 2017 from corresponding international application No. PCT/EP2016/077648.

*Primary Examiner* — Logan Kraft
(74) *Attorney, Agent, or Firm* — Berenato & White, LLC

(57) ABSTRACT

A hydrokinetic torque converter comprises an impeller rotatable about a rotational axis, a coaxial turbine, and a stator disposed between the impeller and the turbine. The stator includes an annular stator hub, an annular radially outer stator rim, a plurality of stator blades radially outwardly extending between the stator hub and the stator rim, and an annular outer stator flange extending radially outwardly from the stator rim thereof and disposed between an impeller core ring and a turbine core ring. The stator further includes a plurality of hydraulic pressure grooves provided on at least one of axially opposite impeller and turbine side surfaces of the stator flange. The hydraulic pressure grooves face at least one of the impeller and turbine core rings so as to create a hydrodynamic lift between the stator and at least one of the impeller and turbine core rings in the axial direction.

20 Claims, 28 Drawing Sheets

Fig. 12
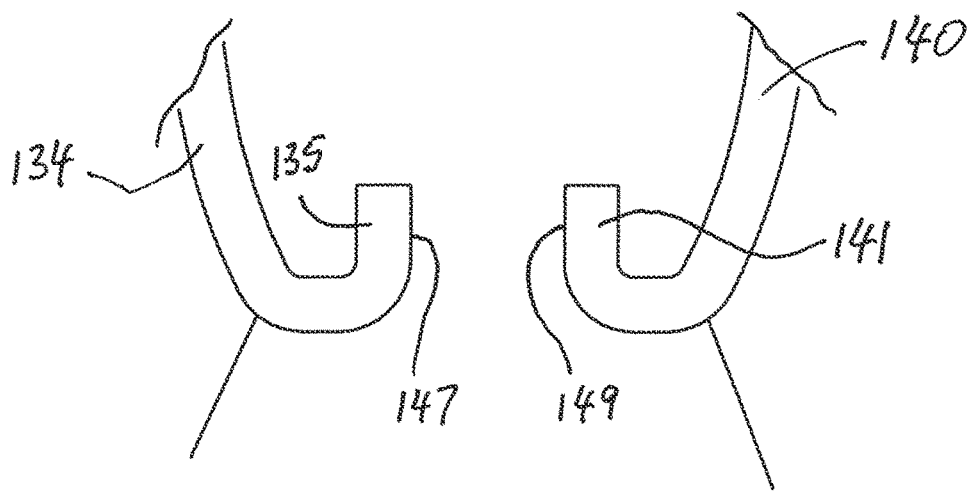
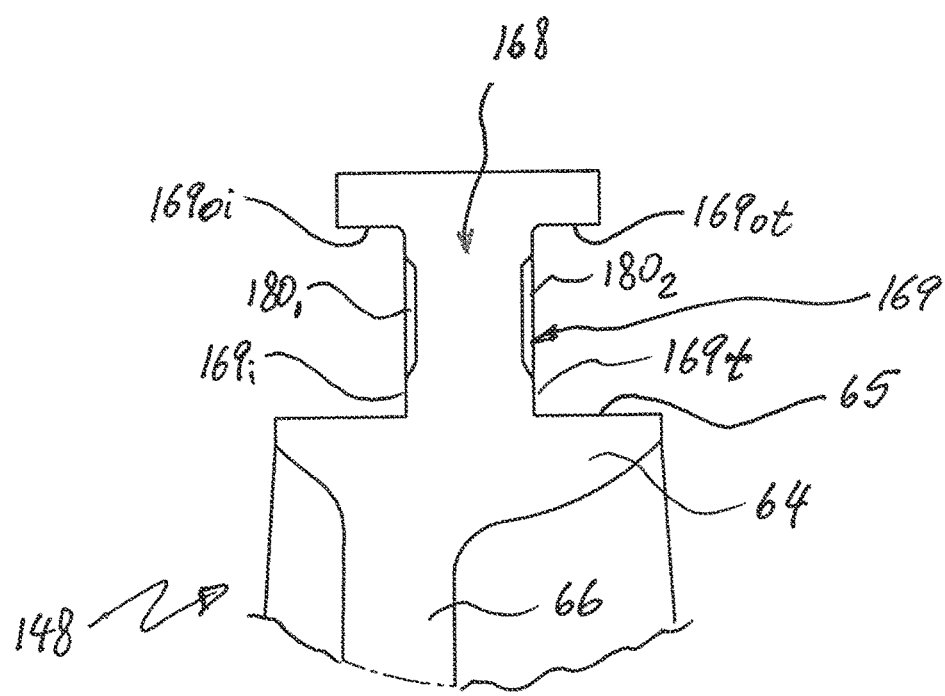
Fig. 13

HYDROKINETIC TORQUE CONVERTER WITHOUT IMPELLER AND TURBINE THRUST BEARINGS, AND METHOD FOR MAKING THE SAME

BACKGROUND OF THE INVENTION

1. Field of the Invention

The present invention generally relates to fluid coupling devices; and more particularly to hydrokinetic torque converters not having thrust bearings between a stator and impeller and turbine shells, and a method for making the same.

2. Background of the Invention

Typically, a hydrokinetic torque converter includes an impeller, a turbine, a stator (or reactor) fixed to a casing of the torque converter, and a one-way clutch for restricting rotational direction of the stator to one direction. The turbine is integrally or operatively connected with a hub linked in rotation to a driven shaft, which is itself linked to an input shaft of a transmission of a vehicle. The casing of the torque converter generally includes a front cover and an impeller shell which together define a fluid filled chamber. Impeller blades are fixed to the impeller shell within the fluid filled chamber to define the impeller wheel. The turbine and the stator are also disposed within the chamber, with both the turbine and the stator being relatively rotatable with respect to the front cover and the impeller shell. The turbine includes a turbine shell with a plurality of turbine blades fixed to one side of the turbine shell facing the impeller blades of the impeller.

The turbine works together with the impeller, which is linked in rotation to the casing that is linked in rotation to a driving shaft driven by an internal combustion engine. The stator is interposed axially between the turbine and the impeller, and is mounted so as to rotate on the driven shaft with the interposition of the one-way clutch.

Current hydrokinetic torque converters are provided with thrust bearings on axially opposite sides of the one-way clutch. One of the thrust roller bearings is disposed between the impeller and the one-way clutch (or a stator hub), and another thrust roller bearing is disposed between the turbine and the one-way clutch. The thrust roller bearings are provided to limit the relative movement between the impeller, the stator and the turbine in the axial direction. In other words, the thrust roller bearings maintain the position of the stator with respect to the impeller and the turbine for relative rotation with respect to each other. The thrust roller bearings are costly and take up a significant amount of axial space within the torque convertor. Therefore, reducing the size of the thrust bearings or eliminating the thrust bearings altogether, would allow the cost and weight of the torque convertor to be reduced and to reduce an axial length thereof.

Current hydrokinetic torque converters and methods for assembling thereof are quite complex, cumbersome and expensive. Therefore, while conventional hydrokinetic torque converters, including but not limited to that discussed above, have proven to be acceptable for vehicular driveline applications and conditions, improvements that may enhance their performance and cost are possible.

BRIEF SUMMARY OF THE INVENTION

According to a first aspect of the invention, there is provided a hydrokinetic torque converter, comprising an impeller rotatable about a rotational axis, a turbine rotatable about the rotational axis and disposed axially opposite to the impeller, and a stator disposed between the impeller and the turbine. The impeller includes an impeller shell, an impeller core ring and a plurality of impeller blades disposed between the impeller shell and the impeller core ring. The turbine is coaxially aligned with and hydrodynamically drivable by the impeller. The turbine includes a turbine shell, a turbine core ring and a plurality of turbine blades disposed between the turbine shell and the turbine core ring. The stator includes an annular stator hub, an annular radially outer stator rim, a plurality of stator blades radially outwardly extending between the stator hub and the outer stator rim, an annular outer stator flange extending radially outwardly from the outer stator rim thereof and disposed between the impeller core ring and the turbine core ring. The outer stator flange has an annular impeller side surface facing the impeller core rings and an annular turbine side surface oriented axially opposite to the impeller side surface of the outer stator flange and facing the turbine core ring. The stator further includes a plurality of hydraulic pressure grooves provided on at least one of the impeller and turbine side surfaces of the outer stator flange. The hydraulic pressure grooves face at least one of the impeller and turbine core rings so as to create a hydrodynamic lift between the stator and at least one of the impeller and turbine core rings in the axial direction.

According to a second aspect of the present invention, there is provided hydrokinetic torque coupling device for coupling together a driving shaft and a driven shaft. The hydrokinetic torque coupling device is rotatable about a rotational axis and comprises a casing rotatable about the rotational axis and comprising an impeller shell and a casing shell connected to and non-rotatable relative to the impeller shell, and a torque converter coaxially aligned with and rotatable about the rotational axis. The torque converter comprises an impeller rotatable about a rotational axis, a turbine rotatable about the rotational axis and disposed axially opposite to the impeller, and a stator disposed between the impeller and the turbine. The impeller includes an impeller shell, an impeller core ring and a plurality of impeller blades disposed between the impeller shell and the impeller core ring. The turbine is coaxially aligned with and hydrodynamically drivable by the impeller. The turbine includes a turbine shell, a turbine core ring and a plurality of turbine blades disposed between the turbine shell and the turbine core ring. The stator includes an annular stator hub, an annular radially outer stator rim, a plurality of stator blades radially outwardly extending between the stator hub and the outer stator rim, an annular outer stator flange extending radially outwardly from the outer stator rim thereof and disposed between the impeller core ring and the turbine core ring. The outer stator flange has an annular impeller side surface facing the impeller core rings and an annular turbine side surface oriented axially opposite to the impeller side surface of the outer stator flange and facing the turbine core ring. The stator further includes a plurality of hydraulic pressure grooves provided on at least one of the impeller and turbine side surfaces of the outer stator flange. The hydraulic pressure grooves face at least one of the impeller and turbine core rings so as to create a hydrodynamic lift between the stator and at least one of the impeller and turbine core rings in the axial direction.

According to a third aspect of the present invention, there is provided a method for assembling a hydrokinetic torque converter. The method involves the steps of providing an impeller including a impeller shell, an impeller core ring and a plurality of impeller blades disposed between the impeller shell and the impeller core ring, providing a turbine including a turbine shell, a turbine core ring and a plurality of turbine blades disposed between the turbine shell and the turbine core ring, and providing a stator. The stator includes an annular stator hub, an annular radially outer stator rim, a plurality of stator blades radially outwardly extending between the stator hub and the outer stator rim, and an annular outer stator flange extending radially outwardly from the outer stator rim. The outer stator flange has an annular impeller side surface, and an annular turbine side surface oriented axially opposite to the impeller side surface of the outer stator flange. The stator further includes a plurality of hydraulic pressure grooves provided on at least one of the impeller and turbine side surfaces of the outer stator flange. The method further includes the step of mounting the impeller, the stator and the turbine together so that the outer stator flange is disposed between the impeller core ring and the turbine core ring and so that the hydraulic pressure grooves faces at least one of the impeller and turbine core rings so as to create a hydrodynamic lift between the stator and at least one of the impeller and turbine core rings in the axial direction.

Other aspects of the invention, including apparatus, devices, systems, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein:

FIG. 12 is an enlarged view of a fragment of the hydrokinetic torque coupling device shown in the circle "11" of FIG. 8 showing radially inner peripheral ends of impeller and turbine core rings only;

FIG. 13 is an enlarged view of a fragment of the hydrokinetic torque coupling device shown in the circle "11" of FIG. 8 showing radially outer end of the stator only;

Figure 1:
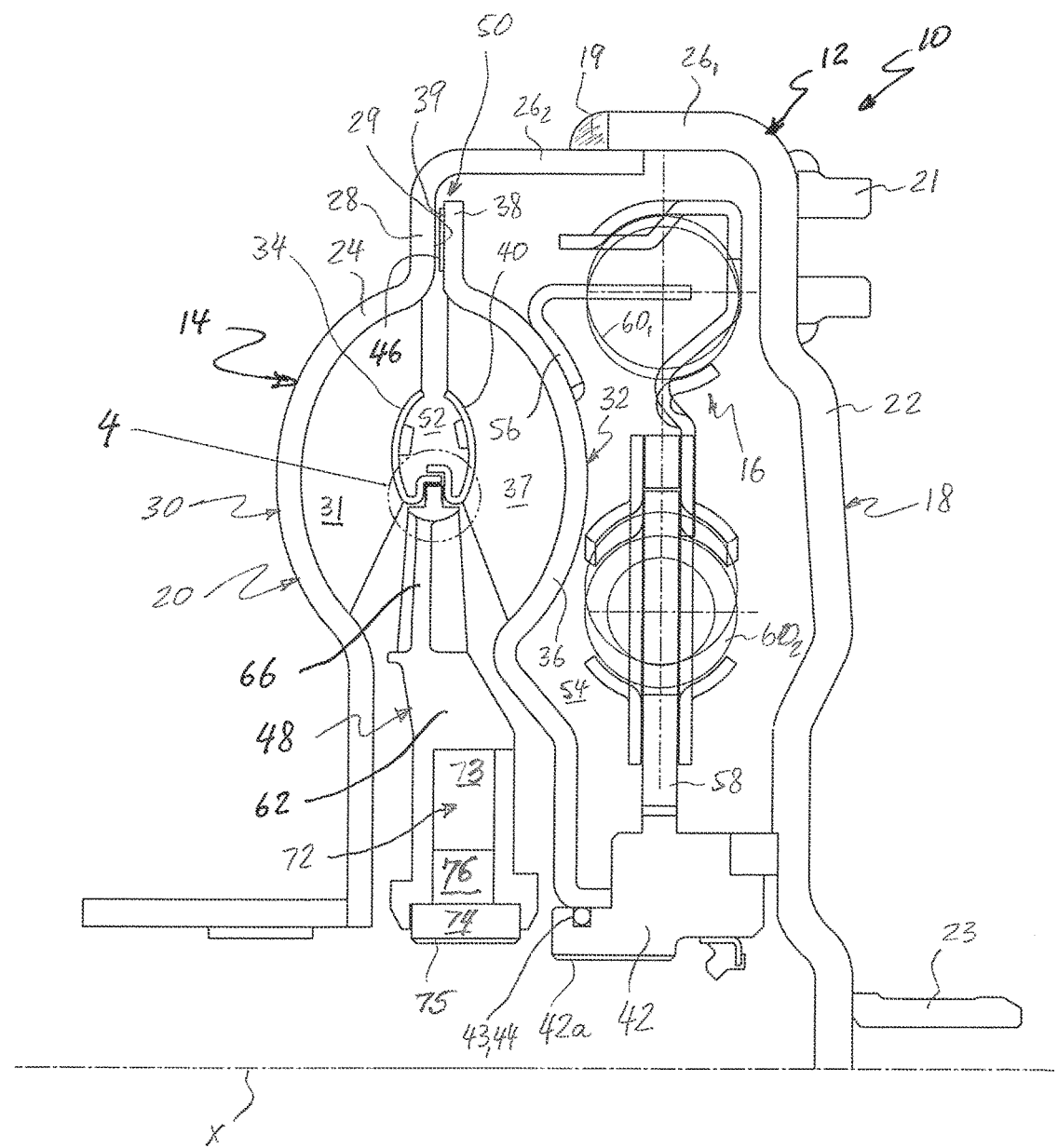
FIG. 1 is a fragmented half-view in axial section of a hydrokinetic torque coupling device in accordance with a first exemplary embodiment of the present invention.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "right", "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the word "a" and "an" as used in the claims means "at least one" and the word "two" as used in the claims means "at least two".

A first exemplary embodiment of a hydrokinetic torque coupling device is generally represented in FIG. 1 by reference numeral 10. The hydrokinetic torque coupling device 10 is intended to couple driving and driven shafts, for example in a motor vehicle. In this case, the driving shaft is an output shaft of an internal combustion engine (not shown) of the motor vehicle and the driven shaft is connected to an automatic transmission (not shown) of the motor vehicle.

The hydrokinetic torque coupling device 10 comprises a sealed casing 12 filled with a fluid, such as oil or transmission fluid, and rotatable about a rotational axis X of rotation, a hydrokinetic torque converter 14 disposed in the casing 12, and a torsional vibration damper (also referred to herein as a damper assembly) 16 also disposed in the casing 12. The sealed casing 12, the torque converter 14, and the torsional vibration damper 16 are all rotatable about rotational axis X. The drawings discussed herein show half-views, that is, a cross-section of the portion or fragment of the hydrokinetic torque coupling device 10 above rotational axis X. As is known in the art, the device 10 is symmetrical about the rotational axis X. Hereinafter the axial and radial orientations are considered with respect to the rotational axis X of the torque coupling device 10. The relative terms such as "axially," "radially," and "circumferentially" are with respect to orientations parallel to, perpendicular to, and circularly around the rotational axis X, respectively.

The sealed casing 12 according to the first exemplary embodiment as illustrated in FIG. 1 includes a casing cover shell (or a first casing shell) 18, and an impeller shell (or a second casing shell) 20 disposed coaxially with and axially opposite to the casing cover shell 18. The first and second casing shells 18, 20 are non-movably (i.e., fixedly) interconnected sealingly together, such as by weld 19 at their outer peripheries. The second casing shell 20 is non-movably (i.e., fixedly) connected to the driving shaft, more typically a flywheel (not shown) that is non-rotatably fixed to the driving shaft, so that the casing 12 turns at the same speed at which the engine operates for transmitting torque. Specifically, in the illustrated embodiment of FIG. 1 the casing 12 is rotatably driven by the internal combustion engine and is non-rotatably coupled to the flywheel thereof with studs 21. As shown in FIG. 1, the studs 21 are fixedly secured, such as by welding, to the impeller shell 20. Each of the first and second casing shells 18, 20 may be made, for example, integrally by press-forming one-piece metal sheets.

The first casing shell 18 includes a first sidewall 22 extending substantially radially relative to the direction from the rotational axis X (i.e., in a plane that is generally transverse to the rotational axis X) and a cylindrical first outer wall portion $26_1$ extending substantially axially from the first sidewall 22 toward the second casing shell 20. Similarly, the second casing shell 20 includes a second sidewall 24 extending substantially radially relative to the direction from the rotational axis X and a cylindrical second outer wall portion $26_2$ extending substantially axially from the second sidewall 24 toward the first casing shell 18. The second sidewall 24 includes an integral piston engagement portion 28 having a first engagement surface 29. The piston engagement portion 28 is embodied as integral with the second sidewall 24 of the second casing shell 20, e.g., made of a single or unitary component. The first and second outer wall portions $26_1$, $26_2$ collectively establish an annular outer wall 26 substantially parallel with the rotation axis X. The weld 19 fixedly secures the outer wall portions $26_1$ and $26_2$ together.

The torque converter 14 includes an impeller (sometimes referred to as the pump or impeller wheel) 30, a turbine-piston 32, and a stator (sometimes referred to as the reactor) 48 interposed axially between the impeller 30 and the turbine-piston 32. The impeller 30, the turbine-piston 32, and the stator 48 are coaxially aligned with one another on the rotational axis X. The impeller 30, the turbine-piston 32, and the stator 48 collectively form a torus. The impeller 30 and the turbine-piston 32 may be fluidly coupled to one another in operation as known in the art.

The second casing shell 20 of the casing 12 also forms and serves as the impeller shell of the impeller 30. Accordingly, the impeller shell 20 sometimes is referred to as part of the casing 12. The impeller 30 further includes a substantially annular impeller core ring 34, and a plurality of impeller blades 31 fixedly attached, such as by brazing, to the impeller shell 20 and the impeller core ring 34. The impeller 30, including the impeller shell 20, the impeller core ring 34 and the impeller blades 31, is non-rotatably secured to the first casing shell 18 and hence to the drive shaft (or flywheel) of the engine to rotate at the same speed as the engine output. The casing cover shell 18 also includes a casing hub 23 fixedly secured to the first sidewall 22 thereof. The casing hub 23 is arranged for engagement with a hydraulic pump of the transmission.

The piston engagement portion 28 is disposed radially outside of the impeller blades 31. The piston engagement portion 28 of the second sidewall 24 is in the form of a substantially annular, planar wall and extends substantially radially relative to the rotational axis X. The first engagement surface 29 of the piston engagement portion 28 faces a turbine-piston flange 38 (discussed below) and the first casing shell 18, as best shown in FIG. 1.

The turbine-piston 32 is a consolidation or incorporation of a turbine with a lockup clutch piston. The turbine component of the turbine-piston 32 includes a turbine-piston shell 36, a substantially annular turbine core ring 40, and a plurality of turbine blades 37 fixedly attached, such as by brazing, to the turbine-piston shell 36 and the turbine core ring 40. Spinning or rotation of the impeller 30 causes transmission fluid in the torus to spin or rotate the turbine blades 37, and hence the turbine-piston shell 36. The substantially annular, semi-toroidal (or concave) impeller shell 20 and the substantially annular, semi-toroidal (or concave) turbine-piston shell 36 collectively define a substantially toroidal first chamber (or torus chamber) 52 therebetween. Referring to FIG. 1, the torus chamber 52 is to the left side of the turbine-piston shell 36, and a second (or damper) chamber 54 is to the other (right) side of the turbine-piston shell 36. The first chamber 52 is defined between the impeller shell 20 and the turbine-piston shell 36, while the second chamber 54 is defined between the turbine-piston shell 36 and the casing cover shell 18.

The stator 48 is positioned between the impeller 30 and the turbine-piston 32 to redirect fluid from the turbine-piston 32 back to the impeller 30 in an efficient manner. The stator 48 is typically mounted on a one-way clutch 72 to prevent the stator 48 from counter-rotation. The one-way clutch 72 is disposed substantially in a bearing central bore in the stator 48 coaxially to the rotational axis X. The one-way clutch 72, as best shown in FIG. 1, includes an outer ring 73 non-rotationally secured (e.g., fixed) to the stator 48 coaxially to the rotational axis X, an inner ring 74 coaxial to the rotational axis X, and a plurality of sprags or rollers 76. The sprags or rollers 76 are circumferentially disposed in an annular space defined between the outer ring 73 and the inner ring 74, and may act as cams. An inner peripheral surface of the inner ring 74 has splines 75 for coupling to radially outer splines of an input shaft support (not shown). Accordingly, the stator 48 is axially moveable relative the impeller shell 20 and the turbine-piston shell 36. The outer ring 73 is mounted within the bearing central bore of the stator 48 coaxially to the rotational axis X so as to non-rotatably engage the stator 48. The outer ring 73 can be toothed externally and force-fit into the bearing central bore of the stator 48 so as to secure the outer ring 73 of the one-way clutch 72 non-rotatably relative to the stator 48.

The hydrokinetic torque coupling device 10 further includes an output hub 42 that is rotatable about the rotational axis X. The output hub 42 is operatively coupled to and coaxial with the driven shaft. For example, the output hub 42 may be provided with internal splines 42a for non-rotatably coupling the output hub 42 to the driven shaft, such as a transmission input shaft, provided with complementary external splines. Alternatively, a weld or other connection may be used to fix the output hub 42 to the driven shaft. A radially outer surface of the output hub 42 includes an annular slot 43 for receiving a sealing member, such as an O-ring 44.

The piston component of the turbine-piston 32 includes a substantially annular, planar (i.e., flat) turbine-piston flange (or turbine-piston wall) 38. The turbine-piston flange 38 is distal to the rotational axis X relative to the above-discussed proximal flange 37. The turbine-piston flange 38 is a radial extension of the turbine-piston shell 36 and, as illustrated in FIG. 1, is disposed radially outside of the turbine blades 37.

The turbine-piston flange 38 and the turbine-piston shell 36 are embodied as integral with one another, e.g., made of a single or unitary component, but may be separate components connected together. The turbine-piston flange 38 extends from a radially outer peripheral end of the turbine-piston shell 36 radially outward, transverse to rotational axis X, to terminate at an end in spaced relationship to the inner peripheral surface of the annular outer wall portion $26_2$ of the casing 12. The turbine-piston flange 38 extends sufficiently outward radially to axially overlap with the piston engagement portion 28 of the second casing shell 20.

As best shown in FIG. 1, the turbine-piston flange 38 has a flange surface 39 facing the piston engagement portion 28 of the second casing shell 20. The engagement surface 29 and the flange surface 39 are parallel to and face one another. The flange surface 39 faces and, as explained below, is movable axially toward and away from the engagement surface 29 of the casing 12 to position the turbine-piston flange 38 of the turbine-piston 32 respectively into and out of a lockup position or, in other words, to position the torque coupling device 10 into and out of a lockup mode, respectively. The turbine-piston flange 38 of the turbine-piston 32 and the piston engagement portion 28 of the casing 12 together create a lockup clutch 50 that bypasses the hydrodynamic fluid coupling of the torque converter 14 and mechanically couples the driving and driven shafts.

In accordance with the exemplary embodiment, the flange surface 39 of the turbine-piston flange 38 is provided with a friction ring (or friction lining) 46, best shown in FIG. 1, which shows the lockup clutch 50 in a non-lockup mode. The friction ring 46 may be secured to the flange surface 39, for example, by adhesive bonding and/or with fasteners. The friction ring 46 is made of a suitable friction material to improve frictional performance. Alternatively, a friction ring (or friction lining) may be secured to the engagement surface 29. According to still another embodiment, a first friction ring or liner is secured to the engagement surface 29 of the casing 12 and a second friction ring or liner is secured to the flange surface 39. It is within the scope of the invention to omit one or both of the friction rings.

The torsional vibration damper 16 is housed in the casing 12 axially between the turbine-piston 32 and the first sidewall 22 of the casing 12, as shown in FIG. 1. The torsional vibration damper 16 is connected to a drive (or input) member 56 (discussed below), and includes a plurality of circumferential elastic damping members $60_1$ and $60_2$, and a driven (or output) member 58 drivingly coupled to the drive member 56 through the circumferential damping members $60_1$ and $60_2$. According to the exemplary embodiment of FIG. 1, the damping members $60_1$ and $60_2$ are configured as helical (or coil) springs having a principal axis oriented substantially circumferentially about axis X. Other elastic members may be selected to replace or supplement the springs $60_1$ and $60_2$. The driven member 58 is non-rotatably coupled (connected) to the output hub 42. The non-rotatable connection between the driven member 58 and the output hub 42 may be formed by splines or welding. Alternatively, the output hub 42 and driven member 58 may be integrally formed as a single piece.

The turbine-piston 32 is axially moveable toward and away from the impeller shell 20 between a lockup position and a non-lockup (open) position. Axial movement of the turbine-piston 32 is accomplished by changing the pressure differential across the opposite sides of the turbine-piston shell 36. A pressure increase in the damper chamber 54 relative to the torus chamber 52 (or stated differently a pressure decrease in the torus chamber 52 relative to the damper chamber 54) shifts the turbine-piston shell 36 axially in the direction of torque transmission, i.e., towards the output side of the casing 12, that is right to left in FIG. 1, into the lockup position. On the other hand, a pressure decrease in the damper chamber 54 relative to the torus chamber 52 (or stated differently a pressure increase in the torus chamber 52 relative to the damper chamber 54) acts to shift the turbine-piston shell 36 and the turbine-piston flange 38 axially against the direction of torque transmission, i.e., towards the input side of the casing, that is left to right in FIG. 1, out of the lockup position. Pressure changes are created by control of the fluid, e.g., hydraulic fluid or oil, in the chambers 52 and 54.

In the lockup mode, the turbine-piston shell 36 is displaced axially towards the impeller 30 until the frictional ring 46 of the flange surface 39 of the turbine-piston flange 38 (which moves axially with the turbine-piston shell 36) abuts against and is non-rotatably frictionally coupled to the engagement surface 29 of the casing 12. In the lockup mode, torque is transferred from the engine to the casing 12, then by way of the frictional engagement between surfaces 29 and 39 (or the frictional lining 46 thereof) through the turbine piston shell 36 to the drive member 56 welded thereto, then serially to the damping assembly 16 and the output hub 42.

In the non-lockup mode, the turbine-piston 32 is displaced axially away from the impeller 30, axially moving the turbine-piston shell 36 and the turbine-piston flange 38 until the flange surface 39 (that is, the frictional lining 46 thereof) is spaced from and no longer non-rotatably frictionally coupled to the engagement surface 29. Thus, torque is transferred from the engine to the casing 12 in a hydrodynamic transmission mode that does not bypass the torque converter 14 through the lockup clutch 50. Notably, in the non-lockup mode an open fluid passage is established between the engagement surface 29 of the casing 12 and the flange surface 39. Hydraulic fluid is free to flow between the torus chamber 52 and the damper chamber 54.

In operation, the lockup clutch 50 is generally activated after the hydraulic (hydrodynamic) coupling of the driving and driven shafts, typically at relatively constant speeds, in order to avoid the loss of efficiency caused in particular by slip phenomena between the turbine-piston 32 and the impeller 30. Because of the axial pressures acting on the turbine-piston 32 for movement between its lockup and non-lockup positions, the turbine-piston shell 36 may be made somewhat thicker than typical turbine shells that do not form or function as the lockup piston.

The turbine-piston 32 both forms the shell component of the turbine and the piston component of the lockup clutch 50, as described above. By consolidating two components that are normally separate from one another into a single component, space is saved in the hydrokinetic torque coupling device 10. This space-saving structure provides several design options. For example, the hydrokinetic torque coupling device 10 may be made smaller and lighter. Alternatively, the free space within the casing 12 may be used to add additional components, such as damping components.

The stator 48 is rotatably mounted to stator shaft (not shown) through a one-way (or overrunning) clutch 72. The one-way clutch 72 permits rotation of the stator 48 in one direction only. The stator 48, according to the first exemplary embodiment of the present invention best illustrated in FIGS. 1 and 2, includes an annular stator hub 62, an annular radially outer rim 64 and a plurality of stator blades (or vanes) 66 radially outwardly extending between the stator hub 62 and the outer rim 64, and non-movably (i.e., fixedly) secured thereto. The stator 48 further includes an annular outer flange 68 extending radially outwardly from the outer rim 64. The outer flange 68 has an annular impeller side surface 69*i* and an annular turbine side surface 69*t* oriented axially opposite to each other, and a radially outer cylindrical surface 69*o*. The annular impeller and turbine side surfaces 69*i* and 69*t* as well as the cylindrical outer surface 69*o* are coaxial with the rotational axis X, and define an outer peripheral surface of the outer flange 68 of the stator 48. The impeller and turbine side surfaces 69*i* and 69*t* and the cylindrical outer surface 69*o* collectively define an outer peripheral surface 69 of the outer flange 68 of the stator 48. According to the first exemplary embodiment of the present invention illustrated in FIGS. 1 and 2, the axially opposite impeller side surface 69*i* and the turbine side surface 69*t* of the stator 48 are substantially orthogonal to the rotational axis X, while the cylindrical outer surface 69*o* is coaxial with the rotational axis X.

A radially inner peripheral end 35 of the impeller core ring 34 includes a substantially annular radial flange 35*r* having a substantially annular axially inner surface 47*r* adjacent to and facing the impeller side surface 69*i* of the outer flange 68 of the stator 48, and a substantially annular axial flange 35*a* having a substantially annular radially inner surface 47*a* adjacent to and facing the outer cylindrical surface 69*o* of the outer flange 68 of the stator 48. According to the exemplary embodiment of the present invention illustrated in FIGS. 1 and 4, the inner surface 47*r* of the radial flange 35*r* of the impeller core ring 34 extends substantially parallel to the impeller side surface 69*i* of the outer flange 68, while the inner surface 47*a* of the axial flange 35*a* thereof extends substantially parallel to the outer cylindrical surface 69*o* of the outer flange 68.

Similarly, a radially inner peripheral end 41 of the turbine core ring 40 includes a substantially annular radial flange 41*r* having a substantially annular axially inner surface 49*r* adjacent to and facing the turbine side surface 69*t* of the outer flange 68 of the stator 48, and a substantially annular axial flange 41*a* having a substantially cylindrical axially inner surface 49*a* extending substantially parallel to the outer cylindrical surface 69*o* of the outer flange 68 of the stator 48. According to the first exemplary embodiment of the present invention illustrated in FIG. 2, the inner surface 49*r* of the radial flange 41*r* of the turbine core ring 40 extends substantially parallel to the turbine side surface 69*t* of the outer stator flange 68, while the radially inner surface 49*a* of the axial flange 41*a* thereof overlaps the axial flange 35*a* of the impeller core ring 34 so that the axial flange 35*a* of the impeller core ring 34 is disposed radially between the outer cylindrical surface 69*o* of the outer flange 68 of the stator 48 and the axially inner surface 49*a* of the axial flange 41*a* of the turbine core ring 40. In other words, the first exemplary embodiment of the present invention provides an overlap between the impeller and turbine core rings 34 and 40, respectively, and the outer stator flange 68 to improve hydraulic efficiency of the flow within the torus chamber 52 of the torque converter 14. Also, the outer flange 68 of the stator 48 is encapsulated by the radially inner peripheral ends 35 and 41 of the impeller and turbine core rings 34 and 40, respectively.

Figure 4:
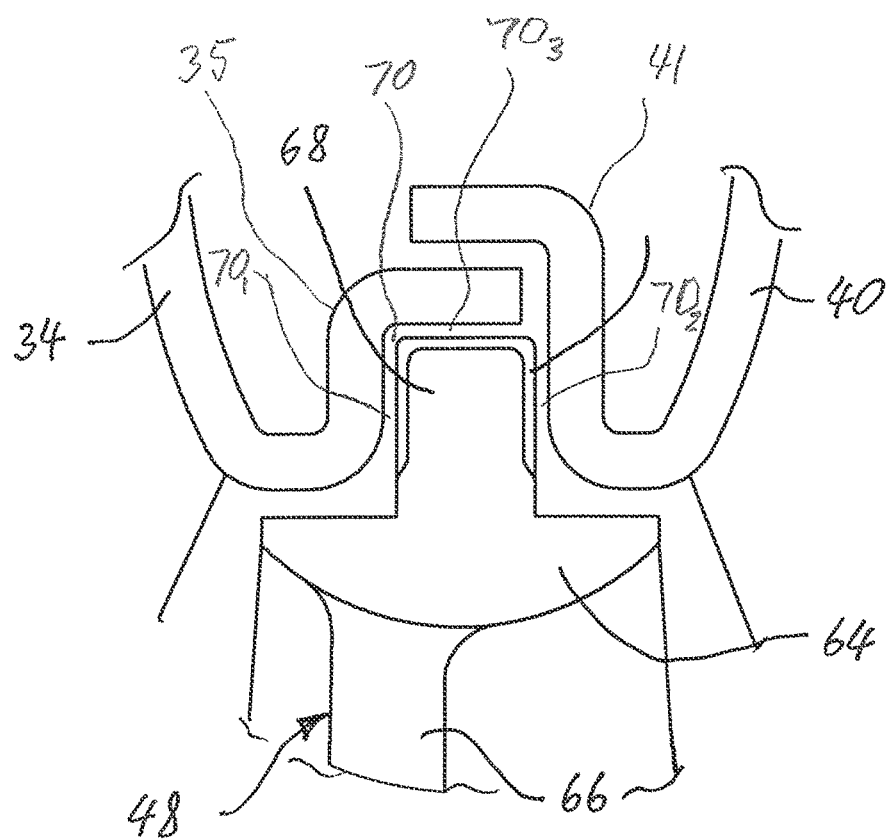
FIG. 4 is an enlarged view of a fragment of the hydrokinetic torque coupling device shown in the circle "4" of FIG. 1.
Figure 5:
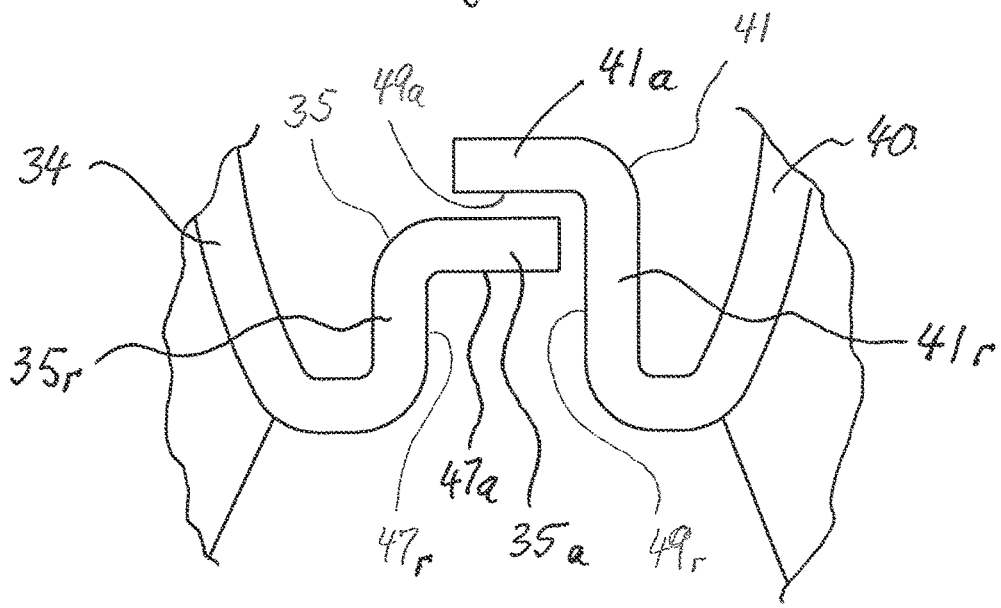
FIG. 5 is an enlarged view of a fragment of the hydrokinetic torque coupling device shown in the circle "4" of FIG. 1 showing radially inner peripheral ends of impeller and turbine core rings only.

According to the first exemplary embodiment of the present invention as best illustrated in FIG. 4, each of the radially inner peripheral end 35 of the impeller core ring 34 and the radially inner peripheral end 41 of the turbine core ring 40 is separated from the outer flange 68 of the stator 48 by a continuous open annular gap 70. Specifically, the inner surface 47*r* of the radial flange 35*r* of the impeller core ring 34 is separated from the impeller side surface 69$i$ of the outer flange 68 by a small annular gap 70$_1$ therebetween. Similarly, the inner surface 49$r$ of the radial flange 41$r$ of the turbine core ring 40 is separated from the turbine side surface 69$t$ of the outer flange 68 by a small annular gap 70$_2$ therebetween. Also, the inner surface 47$a$ of the axial flange 35$a$ of the impeller core ring 34 is separated from the outer cylindrical surface 690 of the outer flange 68 by a small annular gap 70$_3$ therebetween. The annular gaps 70$_1$, 70$_2$ and 70$_3$ are fluidly connected to each other so as to collectively define the continuous open annular gap 70. Moreover, the continuous open annular gap 70 is fluidly connected to the torus chamber 52 of the torque converter 14.

Figure 6:
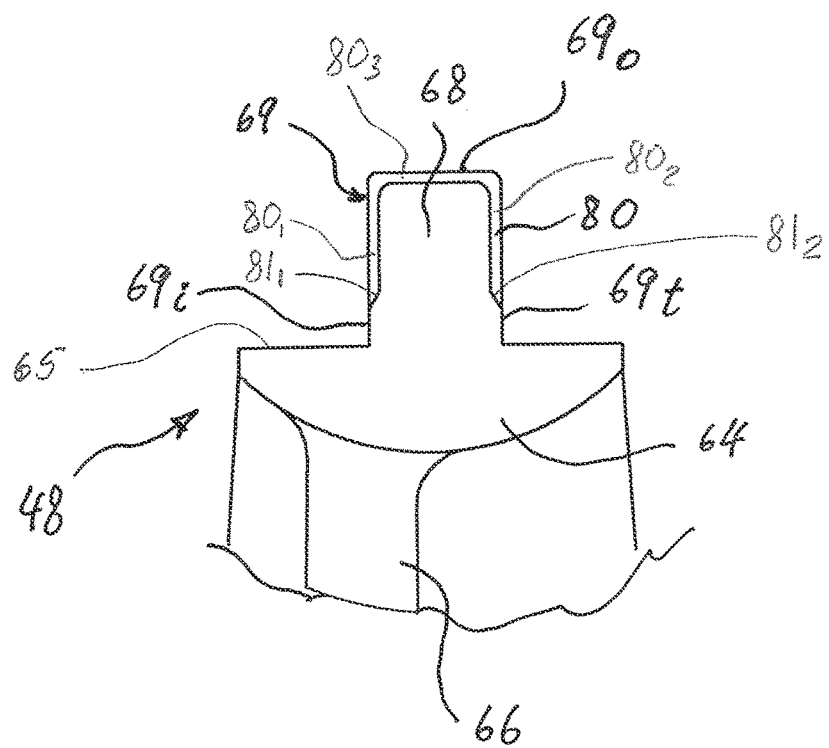
FIG. 6 is an enlarged view of a fragment of the hydrokinetic torque coupling device shown in the circle "4" of FIG. 1 showing radially outer end of the stator only.

Further according to the first exemplary embodiment of the present invention illustrated in FIGS. 2-4, 6 and 7, a plurality of hydraulic pressure grooves 80 are integrally formed on all sides of the outer peripheral surface 69 of the outer flange 68 of the stator 48. The dynamic pressure grooves 80 are spaced circumferentially equidistantly from each other. In other words, the hydraulic pressure grooves 80 are radially formed at predetermined angular intervals in a circumferential direction of the stator 48. Specifically, the impeller side surface 69$i$ of the outer flange 68 is integrally formed with hydraulic pressure grooves 80$_1$ facing the radial flange 35$r$ of the impeller core ring 34, the turbine side surface 69$t$ thereof is integrally formed with hydraulic pressure grooves 80$_2$ facing the radial flange 41$r$ of the turbine core ring 40, and the outer cylindrical surface 690 thereof is integrally formed with hydraulic pressure grooves 80$_3$ facing the axial flange 35$a$ of the impeller core ring 34. As best illustrated in FIGS. 4 and 6, the hydraulic pressure grooves 80$_1$, 80$_2$ and 80$_3$ are fluidly connected to each other so as to collectively define the continuous hydraulic pressure grooves 80. Alternatively, the hydraulic pressure grooves 80 may be formed only on the impeller side surface 69$i$ and the outer cylindrical surface 690 of the stator flange 68, or only on the turbine side surface 69$t$ and the outer cylindrical surface 690 thereof, or only on one of the impeller side surface 69$i$ or the turbine side surface 169$t$ thereof.

Figure 7:
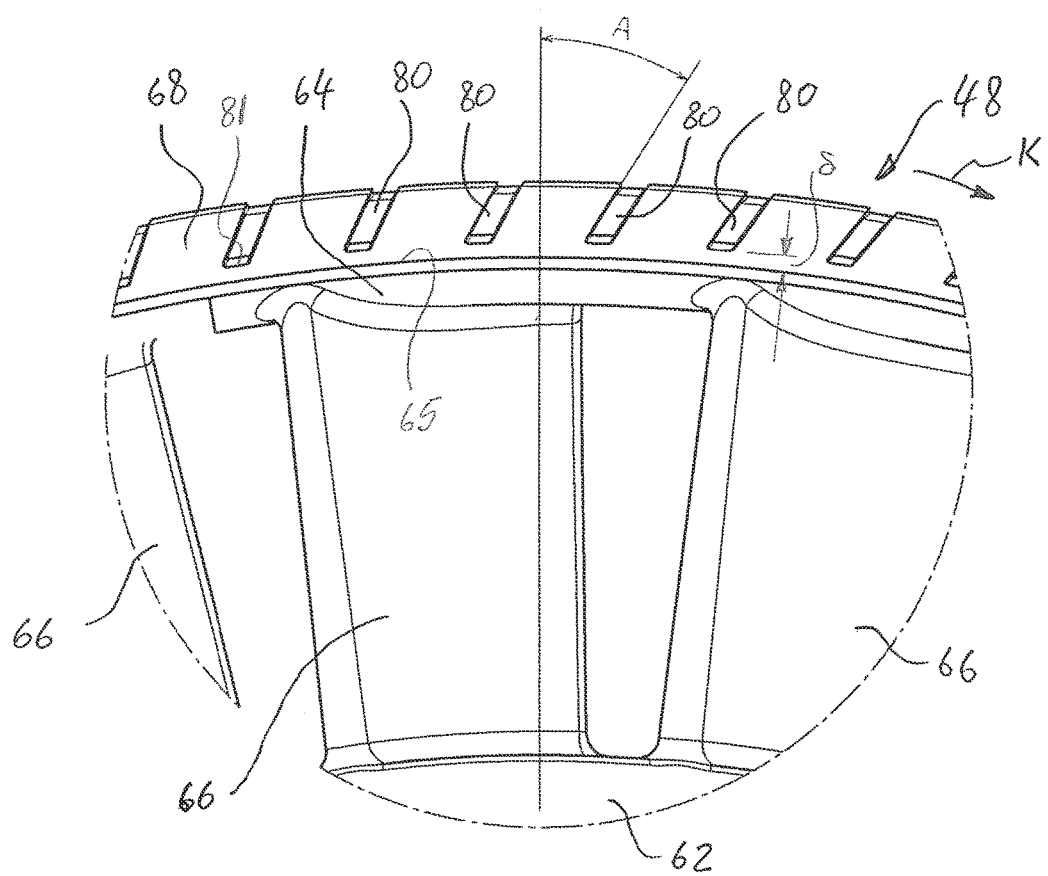
FIG. 7 is an enlarged view of a fragment of the hydrokinetic torque coupling device shown in the circle "7" of FIG. 3.

Each of the hydraulic pressure grooves 80 has two radial distal closed ends 81, as best shown in FIGS. 6 and 7. Specifically, each of the hydraulic pressure grooves 80$_1$ has a radial inner closed end 81$_1$, while each of the hydraulic pressure grooves 80$_2$ has a radial inner closed end 81$_2$. As further illustrated in FIGS. 6 and 7, the radial inner closed ends 81 of each of the hydraulic pressure grooves 80 is radially spaced from a radially outer peripheral surface 65 (which is substantially cylindrical, according to the first exemplary embodiment of the present invention) of the outer rim 64 of the stator 48 by a predetermined distance 6, best shown in FIG. 7. Therefore, the hydraulic pressure grooves 80$_1$ and 80$_2$ are only formed on a portion of a radial width of the impeller and turbine side surfaces 69$i$ and 69$t$, respectively, and have the closed ends 81. As a result, a backup hydraulic fluid pressure is created in the gaps 70$_1$ and 70$_2$, which generates direct hydrodynamic axial thrust between the stator 48 and the impeller 30, on the one hand, and between the stator 48 and the turbine-piston 32, on the other hand, and functions as a thrust bearing and ensures that mechanical friction between the impeller and turbine core rings 34, 40 and the stator 48 of the torque converter 14 during the rotation of the stator 48 and, accordingly, mechanical wear caused by the mechanical friction are excluded.

As noted above, the stator 48 rotates in one direction only due to the one-way clutch 72. According to the first exemplary embodiment of the present invention, the hydraulic pressure grooves 80$_1$ and 80$_2$ formed on the impeller and turbine side surfaces 69$i$ and 69$t$, respectively, are straight (i.e., linear) and oriented at an angle A of about 30° relative to the radial direction, as best illustrated in FIG. 7. It should be understood that the angle A can be more or less than 30°. Moreover, the hydraulic pressure grooves 80 are slanted in a direction, which is selected so that a hydraulic pressure due to the automatic transmission fluid is generated when the stator 48 rotates in the direction of the arrow K in FIG. 7. As shown in FIG. 7, the hydraulic pressure grooves 80 are slanted in the direction radially inside from the outer cylindrical surface 690 of the stator 48 in the direction opposite to the direction of rotation K. The hydraulic pressure grooves 80$_1$ and 80$_2$ on the opposite side surfaces 69$i$ and 69$t$ of the outer flange 68 of the stator 48 may be slanted in the same or different directions relative to the radial direction on each of the side surfaces 69$i$ and 69$t$ of the outer flange 68 of the stator 48. Alternatively, the grooves may have any shape capable of generating a hydraulic fluid pressure, including a herringbone-like shape, triangular, wave-like shape, etc.

In the configuration in which the hydraulic pressure grooves 80 are integrally formed in the outer peripheral surface 69 of the outer flange 68 of the stator 48 as described above, a positive pressure is generated in the gap 70$_1$ between the impeller side surface 69$i$ and the radial flange 35$r$ of the impeller core ring 34, and in the gap 70$_2$ between the turbine side surface 69$t$ and the radial flange 41$r$ of the turbine core ring 40 of the torque converter 14 during the rotation of the stator 48. Therefore, the hydraulic pressure grooves 80 formed in the outer peripheral surface 69 of the outer flange 68 of the stator 48 create a hydraulic fluid pressure (or a hydrodynamic film) in the gaps 70$_1$ and 70$_2$, which function as a thrust bearing between the impeller side surface 69$i$ and the radial flange 35$r$ of the impeller core ring 34, and the turbine side surface 69$t$ and the radial flange 41$r$ of the turbine core ring 40 during the rotation of the stator 48. In other words, the pressure grooves 80 are formed in the outer peripheral surface 69 of the outer flange 68 of the stator 48 so as to create a hydrodynamic film between the stator 48 and the impeller 30 and/or between the stator 48 and the turbine-piston 32 during the rotation of the stator 48 relative to the impeller 30 and/or the turbine-piston 32. Accordingly, the pressure grooves 80 create a thrust bearing effect during rotation of the stator 48 relative to the impeller 30 and/or the turbine-piston 32. Specifically, the hydraulic fluid flowing in the gap 70 flows into the pressure grooves 80 so as to build up a hydraulic fluid pressure in the gap 70 that creates hydrodynamic lift acting axially between the stator 48 and the impeller 30, on the one hand, and between the stator 48 and the turbine-piston 32, on the other hand. Because of this hydraulic fluid pressure, relative rotational movements of the stator 48 relative to the impeller 30 and the turbine-piston 32 only result in fluid friction. Consequently, the mechanical friction and, accordingly, mechanical wear caused by mechanical friction are minimized.

Alternatively, hydraulic pressure grooves may be formed in the inner surface 47$r$ of the radial flange 35$r$ of the impeller core ring 34, the inner surface 49$r$ of the radial flange 41$r$ of the turbine core ring 40, and the inner surface 47$a$ of the axial flange 35$a$ of the impeller core ring 34.

In operation, the hydraulic pressure grooves 80 are formed so that the resistance of the transmission fluid with respect to the relative rotation direction of the stator 48, indicated by the arrow K in FIG. 7, is increased. Specifically, the hydraulic pressure grooves 80 are formed so that, during relative rotation of the stator 48, the transmission fluid is introduced into the gap 70 between the radially inner peripheral ends 35 and 41 of the impeller and turbine core rings 34 and 40, respectively, and the outer stator flange 68 of the stator 48. During relative rotation of the stator 48, a high positive pressure is generated in the gap 70 between the stator 48 and the radially inner peripheral ends 35 and 41 of the impeller and turbine core rings 34 and 40, respectively. Consequently, the hydraulic pressure grooves 80 create the hydrodynamic lift within the gap 70. The hydrodynamic lift is controlled by specific orientation of the hydraulic pressure grooves 80 on the stator flange 68. Therefore, mechanical (or solid, i.e., made of metal or plastic) thrust bearings, such as needle bearings, or thrust washers, which are typical in the conventional torque converters, are not required in the torque converter 14 according to the present invention. It will be appreciated that by varying the angle A of orientation of the hydraulic pressure grooves 80, the value of the positive pressure generated in the gap 70 between the stator 48 and the radially inner peripheral ends 35 and 41 of the impeller and turbine core rings 34 and 40, respectively, can be adjusted.

An exemplary method for assembling the hydrokinetic torque coupling device 10 according to the embodiment of FIGS. 1-7 will now be explained. It should be understood that this exemplary method may be practiced in connection with the other embodiments described herein. This exemplary method is not the exclusive method for assembling the hydrokinetic torque coupling devices described herein. While the methods for assembling the hydrokinetic torque coupling device 10 may be practiced by sequentially performing the steps as set forth below, it should be understood that the methods may involve performing the steps in different sequences.

The impeller 30, the turbine-piston 32, the stator 48, and the damper assembly 16 may each be preassembled. The turbine-piston 32 includes, as noted above, the turbine-piston shell 36, the turbine core ring 40, the turbine blades 37 extending between and attached to the turbine-piston shell 36 and the turbine core 40, and the turbine-piston flange 38.

The radially inner peripheral end 35 of the impeller core ring 34 includes the substantially annular radial flange 35r having the substantially annular axially inner surface 47r and the substantially annular axial flange 35a having the substantially annular radially inner surface 47a. Similarly, the radially inner peripheral end 41 of the turbine core ring 40 includes the substantially annular radial flange 41r having the substantially annular axially inner surface 49r, and the substantially annular axial flange 41a having the substantially cylindrical axially inner surface 49a. According to the first exemplary embodiment of the present invention illustrated in FIG. 2, both the radial flange 35r of the impeller core ring 34 and the radial flange 41r of the turbine core ring 40 extend substantially orthogonal to the rotational axis X, while both the axial flange 35a of the impeller core ring 34 and the axial flange 41a of the turbine core ring 40 extend substantially parallel to the rotational axis X. In other words, the axial flange 35a is substantially orthogonal to the radial flange 35r of the radially inner peripheral end 35 of the impeller core ring 34, while the axial flange 41a is substantially orthogonal to the radial flange 41r of the radially inner peripheral end 41 of the turbine core ring 40.

The stator 48 includes the annular outer flange 68 extending radially outwardly from the outer rim 64. The outer flange 68 has an annular impeller side surface 69i and an annular turbine side surface 69t oriented axially opposite to each other, and a radially outer cylindrical surface 69o.

Figure 2:
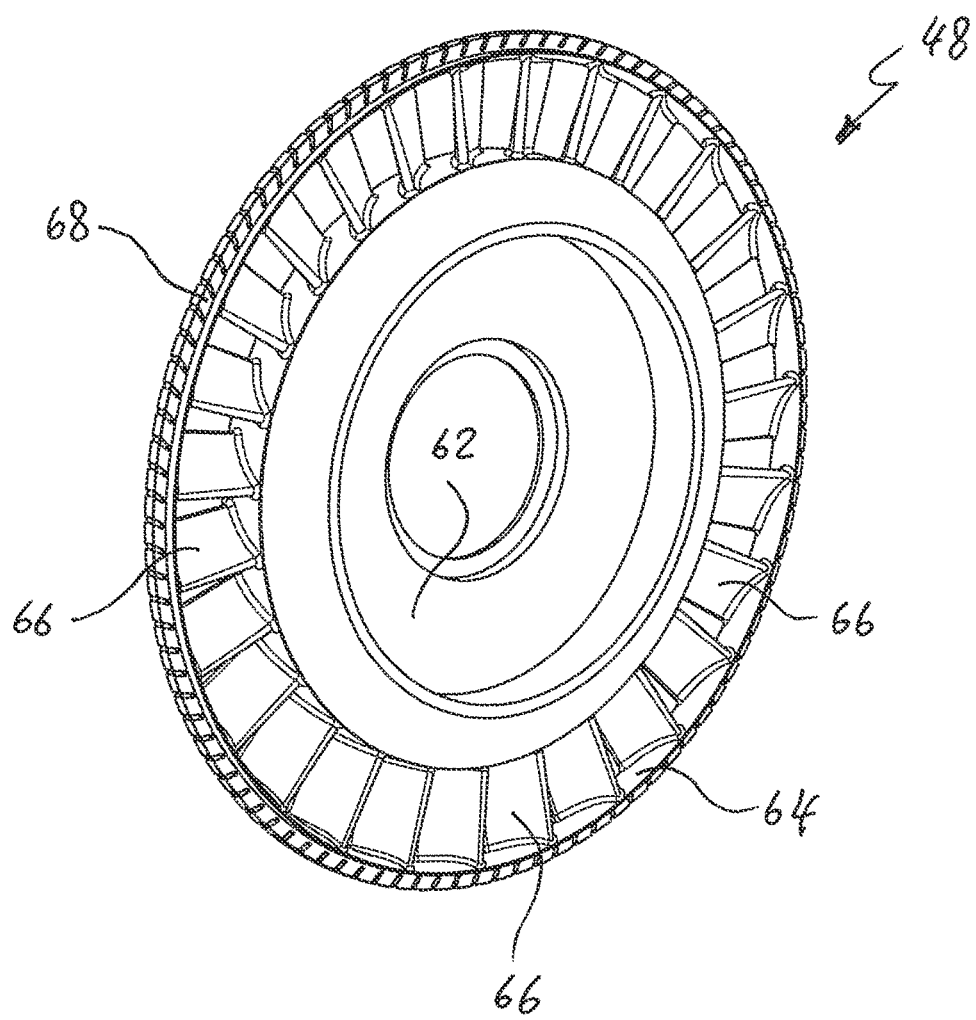
FIG. 2 is a perspective view of a stator of the hydrokinetic torque coupling device in accordance with the first exemplary embodiment of the present invention.
Figure 3:
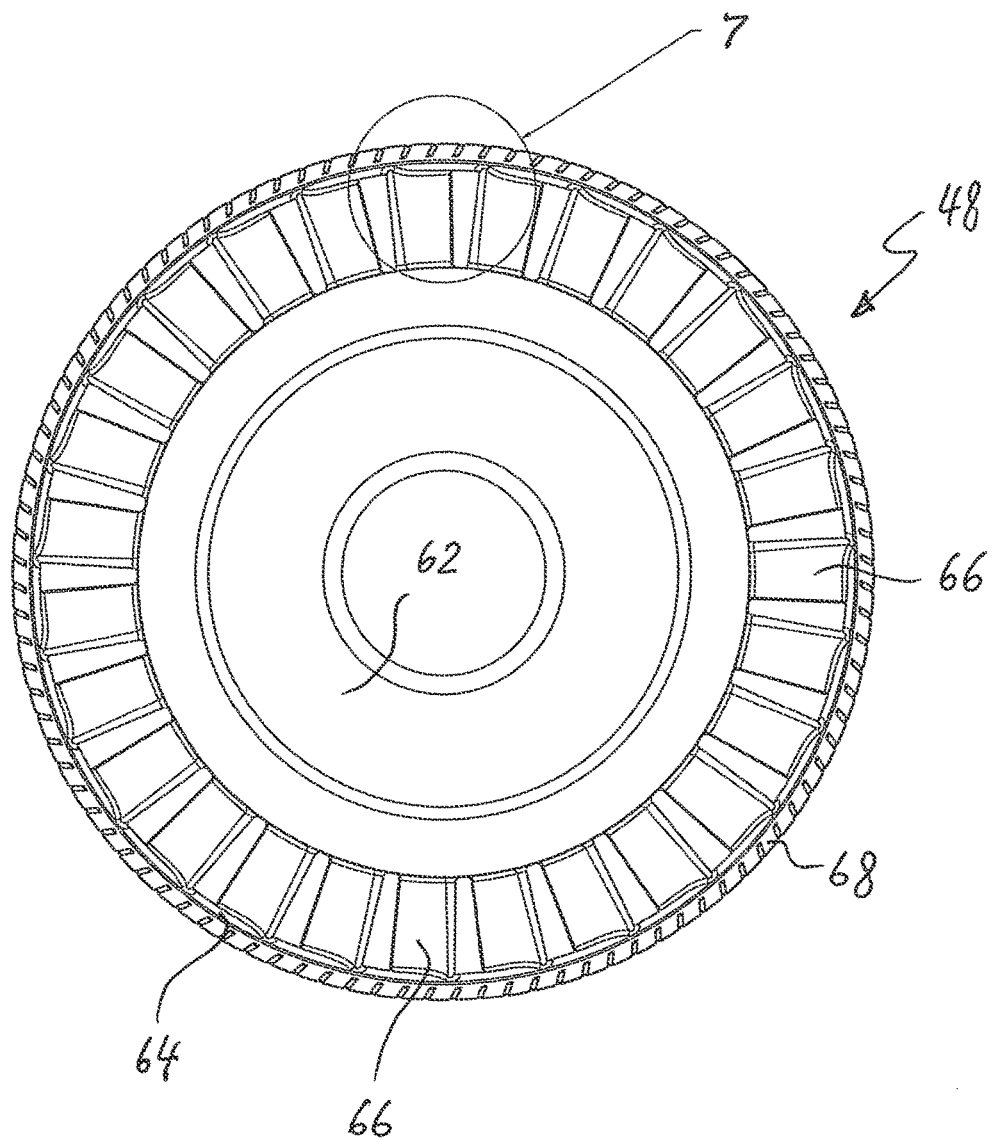
FIG. 3 is a side view of the stator in accordance with the first exemplary embodiment of the present invention.

According to the first exemplary embodiment of the present invention illustrated in FIGS. 1 and 2, the axially opposite impeller side surface 69i and the turbine side surface 69t of the stator 48 are substantially orthogonal to the rotational axis X, while the cylindrical outer surface 69O is coaxial with the rotational axis X. The plurality of hydraulic pressure grooves 80 are formed on all sides of the outer peripheral surface 69 of the outer flange 68 of the stator 48 at predetermined angular intervals in the circumferential direction of the stator 48.

The impeller 30, the stator 48, and the turbine-piston 32 subassemblies are assembled together as shown in the drawings so that the outer flange 68 of the stator 48 is disposed axially between the radial flange 35r of the impeller core ring 34 of the impeller 30 and the radial flange 41r of the turbine core ring 40 of the turbine-piston 32.

The turbine-piston 32 is mounted to slidingly engage the output hub 42 (which is splined with or mounted on the driven shaft) with the seal 44 therebetween. The damper assembly 16 is then added. The drive member 56 is engaged with the damper assembly 16. Then, the first casing shell 18 is non-moveably and sealingly secured, such as by welding at 19, to the second casing shell 20, as best shown in FIG. 1.

Various modifications, changes, and alterations may be practiced with the above-described embodiment, including but not limited to the additional embodiments shown in FIGS. 8-23. In the interest of brevity, reference characters in FIGS. 8-23 that are discussed above in connection with FIGS. 1-7 are not further elaborated upon below, except to the extent necessary or useful to explain the additional embodiments. Modified components and parts are indicated by the addition of a hundred digits to the reference numerals of the components or parts. The features of the embodiments described herein may be practiced with one another and are substitutable in numerous combinations.

FIGS. 8-14 show a second exemplary embodiment of a hydrokinetic torque coupling device generally depicted with the reference numeral 110. The hydrokinetic torque coupling device 110 of the second exemplary embodiment illustrated in FIGS. 8-14, which corresponds substantially to the hydrokinetic torque coupling device 10 of the first exemplary embodiment of FIGS. 1-7, comprises a hydrokinetic torque converter 114 in a sealed casing 12 filled with a transmission fluid. The torque converter 114 includes an impeller 130, a turbine-piston 132, and a stator 148 interposed axially between the impeller 130 and the turbine-piston 132. The impeller 130 includes an impeller shell 20, a substantially annular impeller core ring 134 and a plurality of impeller blades 31, while the turbine-piston 132 includes a turbine-piston shell 36, a substantially annular turbine core ring 140, and a plurality of turbine blades 37.

Figure 8:
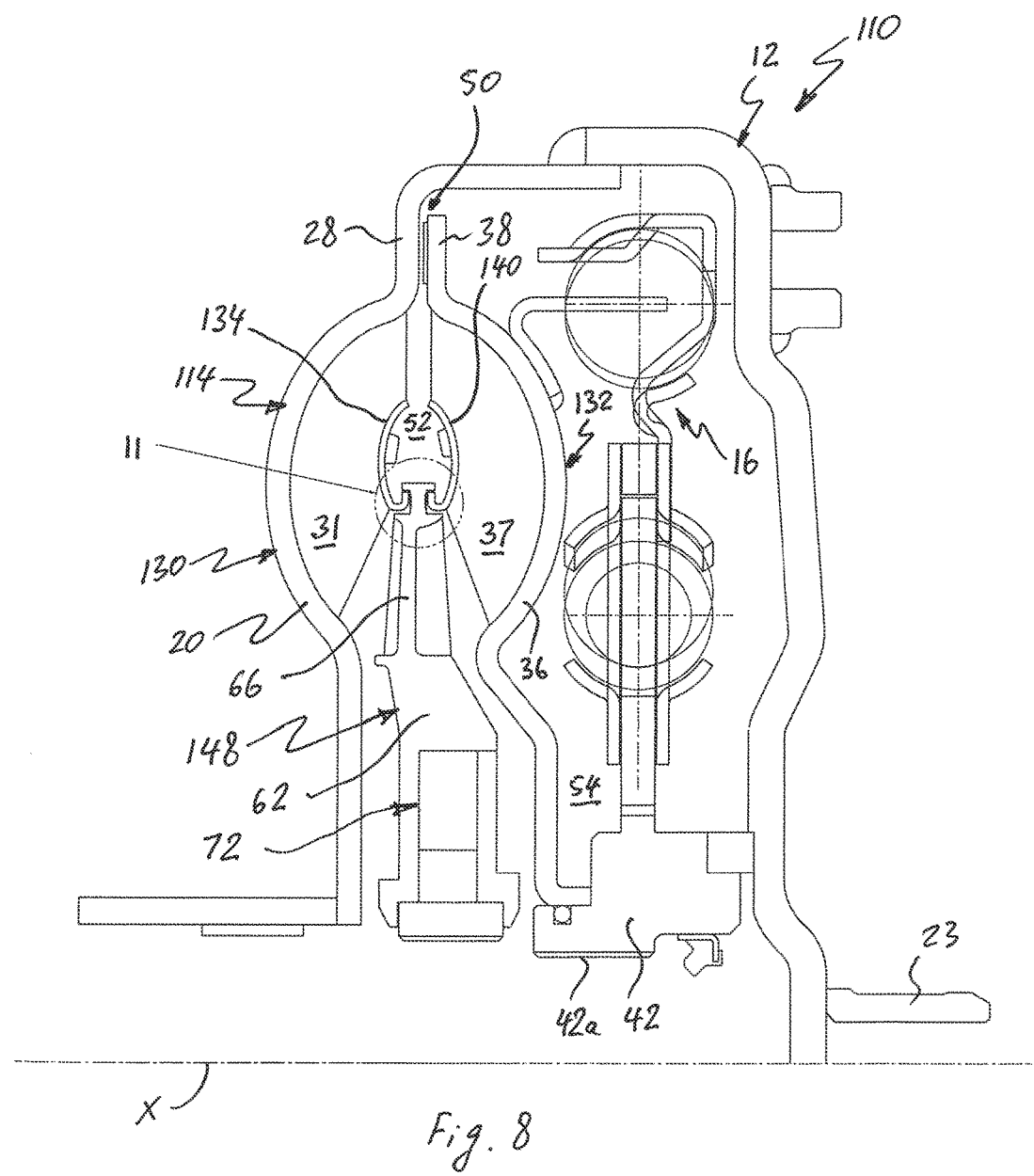
FIG. 8 is a fragmented half-view in axial section of a hydrokinetic torque coupling device in accordance with a second exemplary embodiment of the present invention.
Figure 9:
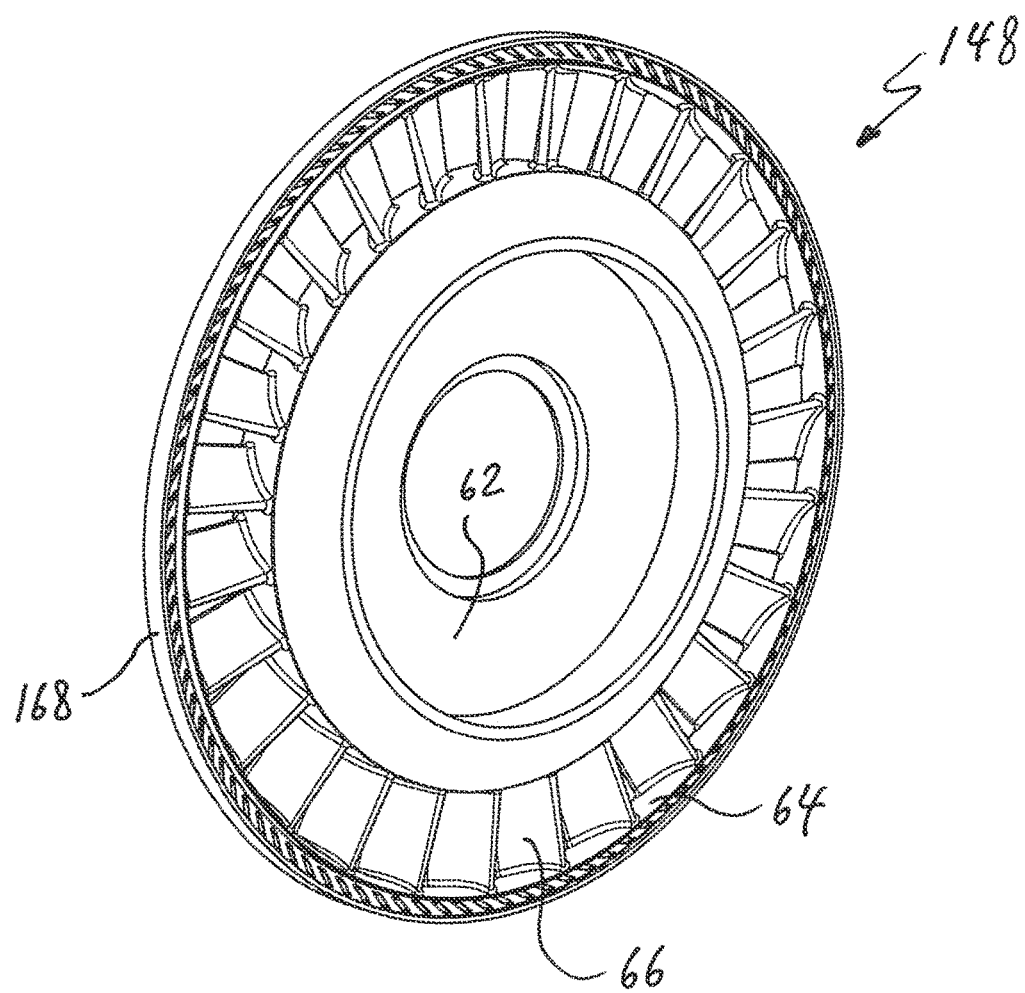
FIG. 9 is a perspective view of a stator of the hydrokinetic torque coupling device in accordance with the second exemplary embodiment of the present invention.
Figure 10:
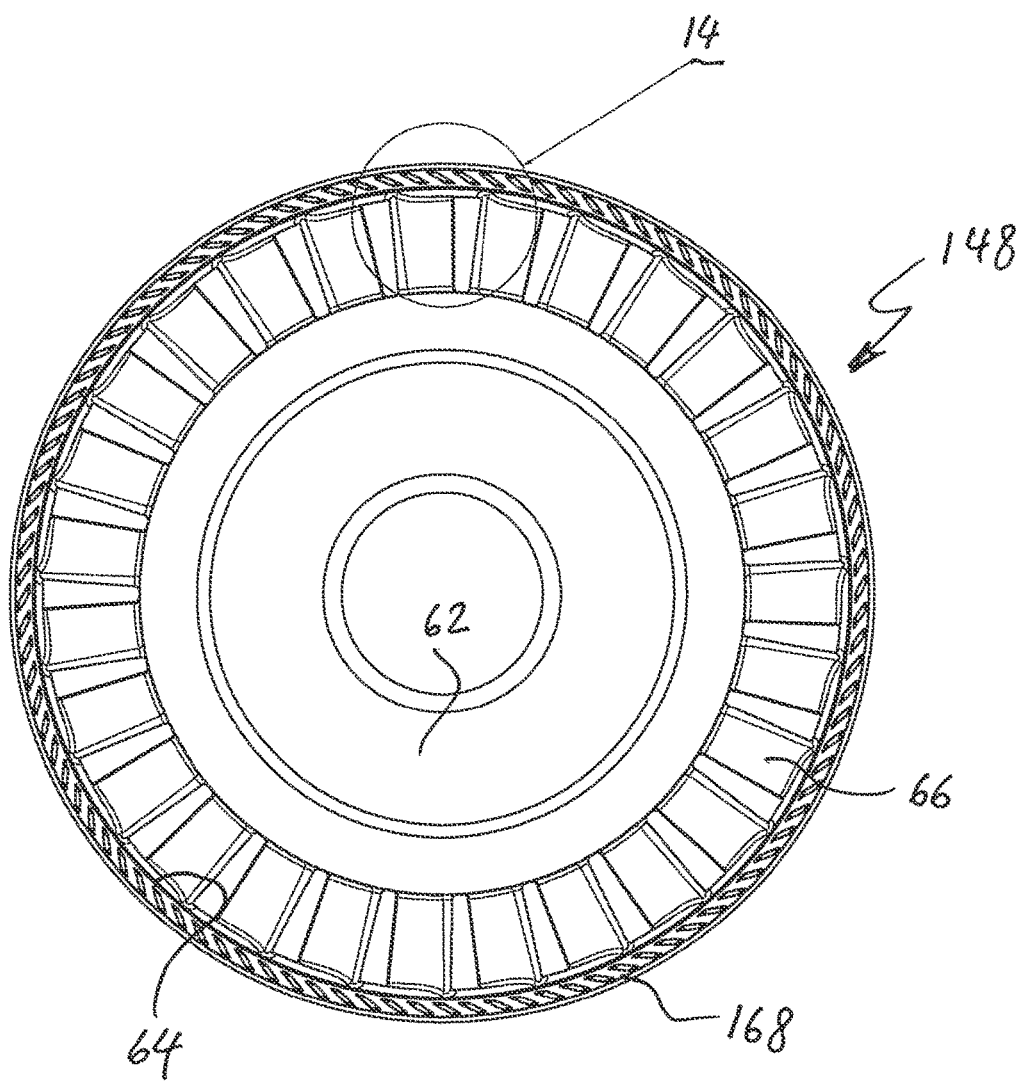
FIG. 10 is a side view of the stator in accordance with the second exemplary embodiment of the present invention.
Figure 11:
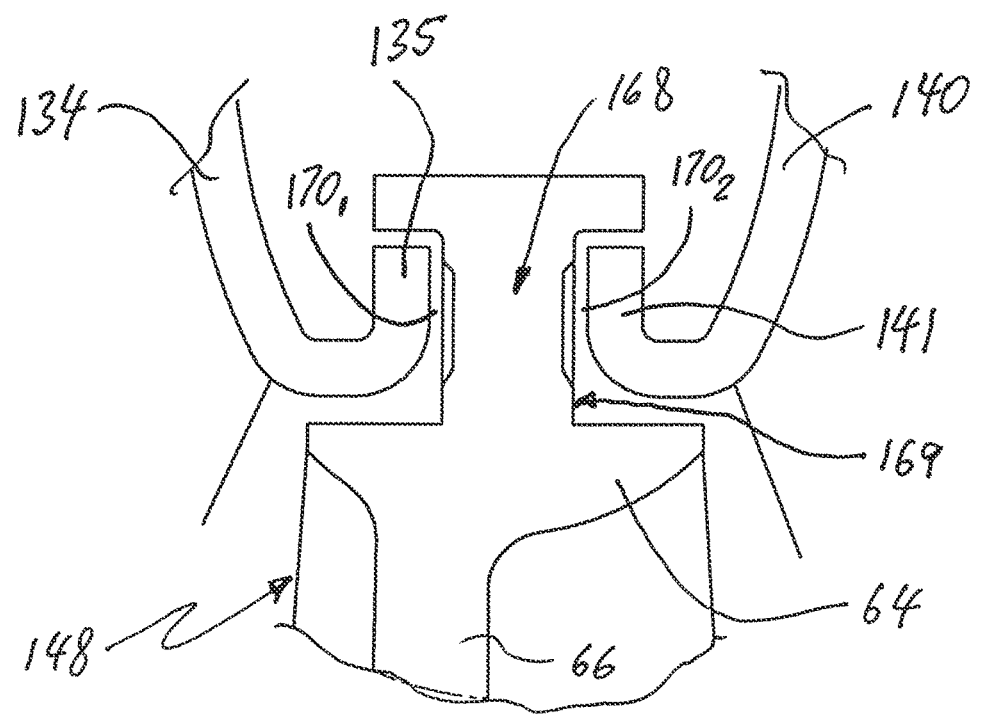
FIG. 11 is an enlarged view of a fragment of the hydrokinetic torque coupling device shown in the circle "11" of FIG. 8.

The stator 148, according to the second exemplary embodiment of the present invention best illustrated in FIGS. 8, 11 and 13, includes an annular stator hub 62, an annular radially outer rim 64 and a plurality of stator blades (or vanes) 66 radially outwardly extending between the stator hub 62 and the outer rim 64, and non-movably (i.e., fixedly) secured thereto. The stator 148 further includes an annular outer stator flange 168 extending radially outwardly from the outer rim 64 and having a generally T-shaped cross-section. The outer stator flange 168 has an annular impeller side surface 169i and an annular turbine side surface 169t oriented axially opposite to each other, a radially inner impeller surface 169oi axially outwardly extending from the impeller side surface 169i toward the impeller shell 20, and a radially inner turbine surface 169ot axially outwardly extending from the turbine side surface 169t toward the turbine shell 36.

The annular impeller and turbine side surfaces 169i and 169t as well as the cylindrical radially inner impeller and turbine surfaces 169oi and 169ot, respectively, are coaxial with the rotational axis X. The impeller and turbine side surfaces 169i and 169t and the cylindrical radially inner surfaces 169oi and 169ot collectively define an outer peripheral surface 169 of the outer stator flange 168 of the stator 148. According to the second exemplary embodiment of the present invention illustrated in FIGS. 8, 11 and 13, the axially opposite impeller side surface 169i and the turbine side surface 169t of the stator 148 are substantially orthogonal to the rotational axis X, while the cylindrical radially inner impeller and turbine surfaces 169oi and 169ot are coaxial with the rotational axis X.

A radially inner peripheral end of the impeller core ring 134 includes a substantially annular radial flange 135 having a substantially annular axially inner surface 147 adjacent to and facing the impeller side surface 169i of the outer flange 168 of the stator 148. According to the second exemplary embodiment of the present invention illustrated in FIGS. 8 and 11, the axially inner surface 147 of the radial flange 135 of the impeller core ring 134 extends substantially parallel to the impeller side surface 169i of the outer flange 168, while a distal end of the radial flange 135 of the impeller core ring 134 is radially spaced from the radially inner impeller surface 169oi of the outer stator flange 168.

Similarly, a radially inner peripheral end of the turbine core ring 140 includes a substantially annular radial flange 141 having a substantially annular axially inner surface 149 adjacent to and facing the turbine side surface 169t of the outer stator flange 168 of the stator 148. According to the second exemplary embodiment of the present invention illustrated in FIGS. 8 and 11, the axially inner surface 149 of the radial flange 141 of the turbine core ring 140 extends substantially parallel to the turbine side surface 169t of the stator flange 168, while a distal end of the radial flange 141 of the turbine core ring 140 is radially spaced from the radially inner turbine surface 169oi of the stator flange 168. In other words, the radially inner peripheral ends 135 and 141 of the impeller and turbine core rings 134 and 140, respectively, are encapsulated by the stator flange 168 of the stator 148 so that the stator flange 168 of the stator 148 is disposed between the radial flange 135 of the impeller core ring 134 and the radial flange 141 of the turbine core ring 140, while the distal ends of the radial flanges 135 and 141 of the impeller and turbine core rings 134 and 140, respectively, are axially overlapped (covered) by the radially inner impeller and turbine surfaces 169oi and 169ot of the stator flange 168.

According to the second exemplary embodiment of the present invention illustrated in FIG. 11, each of the radially inner peripheral end 135 of the impeller core ring 134 and the radially inner peripheral end 141 of the turbine core ring 140 is separated from the outer stator flange 168 of the stator 148 by an open annular gap 170. Specifically, the inner surface 147 of the radial flange 135 of the impeller core ring 134 is separated from the impeller side surface 169i of the outer stator flange 168 by a small annular gap $170_1$ therebetween. Similarly, the inner surface 149 of the radial flange 141 of the turbine core ring 140 is separated from the turbine side surface 169t of the outer stator flange 168 by a small annular gap $170_2$ therebetween. The annular gaps $170_1$ and $170_2$ are fluidly connected to the torus chamber 52 of the torque converter 114. As best shown in FIG. 11, the radially inner surface 169oi of the outer stator flange 168 of the stator 148 overlaps the distal end of the radial flange 135 of the impeller core ring 134, while the radially inner surface 169ot of the outer stator flange 168 overlaps the distal end of the radial flange 141 of the turbine core ring 140.

In other words, the outer peripheral surface 169 of the outer stator flange 168 of the stator 148 overlaps the radially inner peripheral ends of the impeller and turbine core rings 134 and 140, respectively, to encapsulate the radially inner peripheral ends 135 and 141 of the impeller and turbine core rings 134 and 140, respectively, and to improve hydraulic efficiency of the flow within the torus chamber 52 of the torque converter 114.

Further according to the second exemplary embodiment of the present invention illustrated in FIGS. 9-11, 13 and 14, a plurality of hydraulic pressure grooves 180 are for integrally formed on the axially opposite sides of the outer peripheral surface 169 of the stator flange 168 of the stator 148. The dynamic pressure grooves 180 are spaced circumferentially equidistantly from each other. In other words, the hydraulic pressure grooves 180 are radially formed at predetermined angular intervals in a circumferential direction of the stator 48. Specifically, the impeller side surface 169i of the stator flange 168 is integrally formed with hydraulic pressure grooves $180_1$ facing the radial flange 135 of the impeller core ring 134, and the turbine side surface 169t thereof is integrally formed with hydraulic pressure grooves $180_2$ facing the radial flange 141 of the turbine core ring 140. Alternatively, the hydraulic pressure grooves 180 may be formed only on the impeller side surface 169i of the stator flange 168, or only on the turbine side surface 169t thereof.

The hydraulic pressure grooves $180_1$ and $180_2$ are fluidly separated from each other and are referred to in general as "hydraulic pressure grooves 180". Each of the hydraulic pressure grooves 180 has two radial distal closed ends. Specifically, each of the hydraulic pressure grooves 180 has a radial inner closed end 181i and a radial outer closed end 181o.

Figure 14:
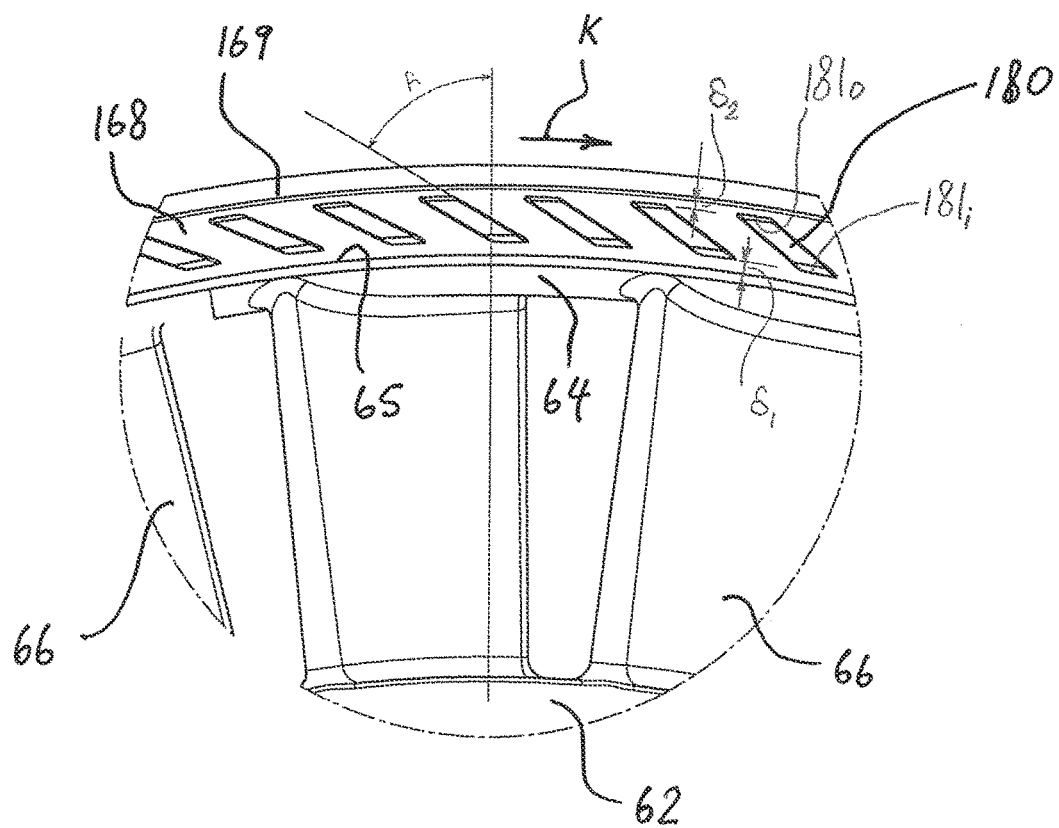
FIG. 14 is an enlarged view of a fragment of the hydrokinetic torque coupling device shown in the circle "14" of FIG. 10.

As further illustrated in FIG. 14, the radial inner closed end 181i of each of the hydraulic pressure grooves 180 is radially spaced from a radially outer peripheral surface 65 (which is substantially cylindrical, according to the second exemplary embodiment of the present invention) of the outer rim 64 of the stator 148 by a predetermined distance $6_1$, while the radial outer closed end 181O of each of the hydraulic pressure grooves 180 is radially spaced from the radially outer peripheral surface 169 (which is substantially cylindrical, according to the second exemplary embodiment of the present invention) of the stator flange 168 of the stator 148 by a predetermined distance $6_2$. Therefore, the hydraulic pressure grooves $180_1$ and $180_2$ are only formed on a portion of a radial width of the impeller and turbine side surfaces 169i and 169t, respectively, and have the opposite inner and outer closed end 181i and 181o, respectively. As a result, a backup hydraulic fluid pressure is created in the gaps $170_1$ and $170_2$, which function as a thrust bearing and ensures that mechanical friction between the impeller and turbine core rings 134, 140 and the stator 148 of the torque converter 114 during the rotation of the stator 148 and, accordingly, mechanical wear caused by the mechanical friction are excluded.

The stator 148 is rotatable in one direction only due to the one-way clutch 72. According to the second exemplary embodiment of the present invention, the hydraulic pressure grooves $180_1$ and $180_2$ formed on the impeller and turbine side surfaces 169i and 169t, respectively, are straight (i.e., linear) and oriented at an angle A of about 60° relative to the radial direction, as best illustrated in FIG. 14. It should be understood that the angle A can be more or less than 60°. Moreover, the hydraulic pressure grooves $180_1$ and $180_2$ are slanted in a direction, which is selected so that a hydraulic pressure of the automatic transmission fluid is generated within the annular gaps $170_1$ and $170_2$ between the stator flange 168 of the stator 148 and the radially inner peripheral end 135 of the impeller core ring 134 and the radially inner peripheral end 141 of the turbine core ring 140, respectively, during the rotation of the stator 148. As best shown in FIG. 14, the hydraulic pressure grooves 180 are slanted in the direction radially inside from the inner turbine surface 169*ot* of the stator 48 in the direction of rotation K. The hydraulic pressure grooves $180_1$ and $180_2$ on the opposite side surfaces 169*i* and 169*t* of the outer stator flange 168 of the stator 148 may be slanted in the same or different directions relative to the radial direction on each of the side surfaces 169*i* and 169*t* of the outer stator flange 168 of the stator 148. Alternatively, the grooves may have any shape capable of generating a hydraulic fluid pressure, including a herringbone-like shape, triangular, wave-like shape, etc.

In the configuration in which the hydraulic pressure grooves $180_1$ and $180_2$ are formed on the impeller and turbine side surfaces 169*i* and 169*t* of the outer stator flange 168 of the stator 148 as described above, a pressure is generated in the gap $170_1$ between the impeller side surface 169*i* and the radial flange 135 of the impeller core ring 134, and in the gap $170_2$ between the turbine side surface 169*t* and the radial flange 141 of the turbine core ring 140 of the torque converter 114 during the rotation of the stator 148. Therefore, the hydraulic pressure grooves $180_1$ and $180_2$ formed in the impeller and turbine side surfaces 169*i* and 169*t* of the outer stator flange 168 of the stator 148 create a hydraulic fluid pressure (or a hydrodynamic film) in the gaps $170_1$ and $170_2$, which function as a thrust bearing between the impeller side surface 169*i* and the radial flange 135 of the impeller core ring 134, and the turbine side surface 169*t* and the radial flange 141 of the turbine core ring 140 during the rotation of the stator 148. In other words, the pressure grooves $180_1$ and $180_2$ are formed in the impeller and turbine side surfaces 169*i* and 169*t* of the outer stator flange 168 of the stator 148 so as to create a hydrodynamic film between the stator 148 and the impeller 130 and/or between the stator 148 and the turbine-piston 132 during rotation of the stator 148 relative to the impeller 130 and/or the turbine-piston 132. Accordingly, the pressure grooves $180_1$ and $180_2$ create a thrust bearing effect during the rotation of the stator 148 relative to the impeller 130 and/or the turbine-piston 132. Specifically, hydraulic fluid flowing in the gaps $170_1$ and $170_2$ flows into the pressure grooves $180_1$ and $180_2$ so as to build up a hydraulic fluid pressure in the gaps $170_1$ and $170_2$ that creates hydrodynamic lift acting axially between the stator 148 and the impeller 130, on the one hand, and between the stator 148 and the turbine-piston 132, on the other hand. The hydrodynamic lift is controlled by orientation of the hydraulic pressure grooves $180_1$ and $180_2$ on the stator flange 168. Because of this hydrodynamic lift, relative rotational movements of the stator 148 relative to the impeller 130 and the turbine-piston 132 only results in fluid friction. Consequently, the mechanical friction and, accordingly, mechanical wear caused by mechanical friction are minimized.

Alternatively, the hydraulic pressure grooves may be formed in the inner surface 147 of the radial flange 135 of the impeller core ring 134, and the inner surface 149 of the radial flange 141 of the turbine core ring 140.

In operation, the hydraulic pressure grooves 180 are formed so that the resistance of the transmission fluid with respect to the relative rotation of the stator 148 is increased. Specifically, the hydraulic pressure grooves 180 are formed so that, during relative rotation of the stator 148, transmission fluid is introduced into the gaps $170_1$ and $170_2$ between the radially inner peripheral ends 135 and 141 of the impeller and the turbine core rings 134 and 140, respectively, and the outer flange 168 of the stator 148. During relative rotation of the stator 148, a pressure is generated in the gaps $170_1$ and $170_2$ between the stator 148 and the radially inner peripheral ends 135 and 141 of the impeller and turbine core rings 134 and 140, respectively. Consequently, the hydraulic pressure grooves $180_1$ and $180_2$ function as a thrust bearing. Therefore, mechanical (or solid, i.e., made of metal or plastic) thrust bearings, such as needle bearings, or thrust washers, which are typical in the conventional torque converters, are not required in the torque converter 114 according to the present invention. It will be appreciated that by varying the angle A of orientation of the hydraulic pressure grooves 180, the value of the pressure generated in the gap 170 between the stator 148 and the radially inner peripheral ends 135 and 141 of the impeller and turbine core rings 134 and 140, respectively, can be adjusted.

FIGS. 15-23 show a third exemplary embodiment of a hydrokinetic torque coupling device generally depicted with the reference numeral 210. The hydrokinetic torque coupling device 210 of the third exemplary embodiment illustrated in FIGS. 15-23, which corresponds substantially to the hydrokinetic torque coupling device 110 of the second exemplary embodiment of FIGS. 8-14, comprises a hydrokinetic torque converter 214 in a sealed casing 12 filled with a transmission fluid. The torque converter 214 includes an impeller 230, a turbine-piston 232, and a stator 248 interposed axially between the impeller 230 and the turbine-piston 232. The impeller 230 includes an impeller shell 20, a substantially annular impeller core ring 234 and a plurality of impeller blades 31, while the turbine-piston 232 includes a turbine-piston shell 36, a substantially annular turbine core ring 240, and a plurality of turbine blades 37.

The stator 248, according to the third exemplary embodiment of the present invention is best illustrated in FIGS. 16-20 and 23, and includes an annular stator hub 62, an annular radially outer rim 64 and a plurality of stator blades (or vanes) 66 radially outwardly extending between the stator hub 62 and the outer rim 64, and non-movably (i.e., fixedly) secured thereto. The stator 248 further includes an annular outer stator flange 268 extending radially outwardly from the outer rim 64. The outer stator flange 268 has an annular impeller side surface 269*i* and an annular turbine side surface 269*t* oriented axially opposite to each other.

The annular impeller and turbine side surfaces 269*i* and 269*t* are coaxial with the rotational axis X. The impeller and turbine side surfaces 269*i* and 269*t* collectively define an outer peripheral surface 269 of the outer stator flange 268 of the stator 248. According to the third exemplary embodiment of the present invention illustrated in FIGS. 15, 21 and 23, the axially opposite impeller side surface 269*i* and the turbine side surface 269*t* of the stator flange 268 of the stator 248 are substantially orthogonal to the rotational axis X.

Figure 21:
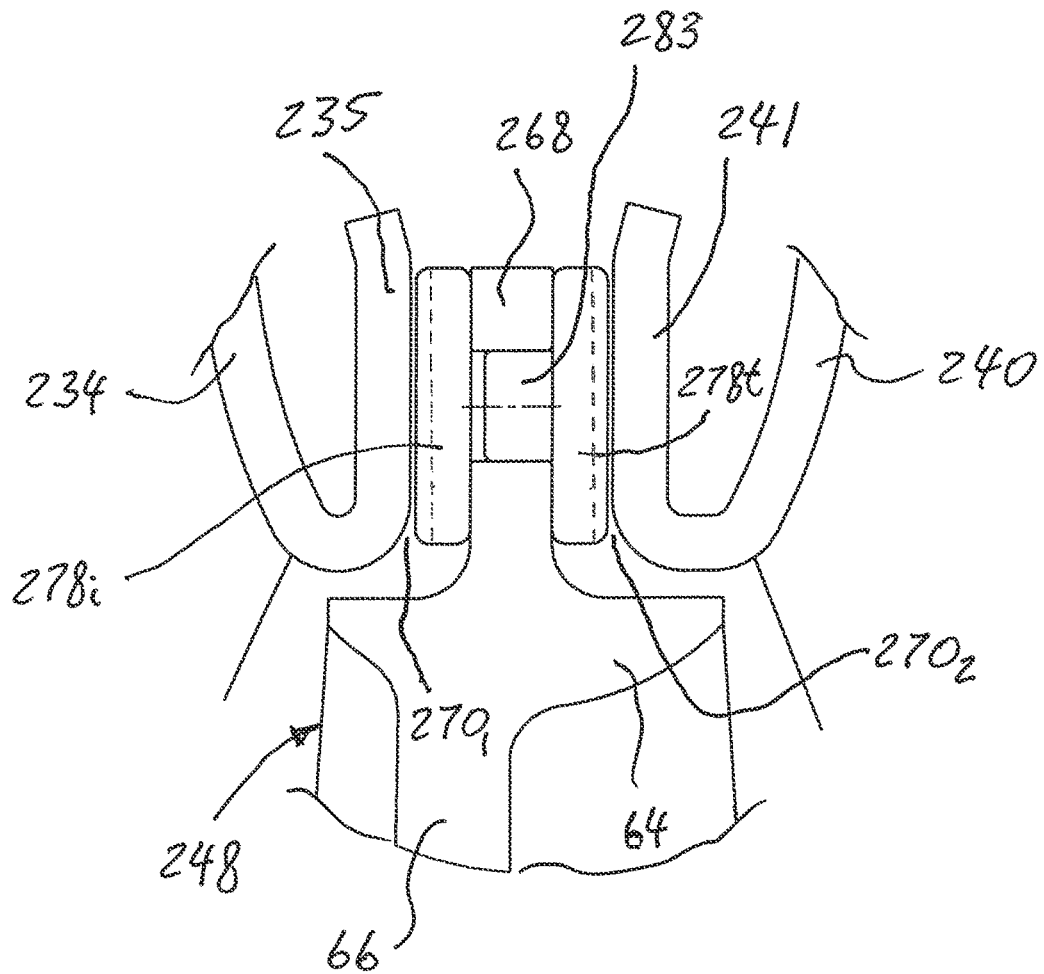
FIG. 21 is an enlarged view of a fragment of the hydrokinetic torque coupling device shown in the circle "21" of FIG. 15.
Figure 22:
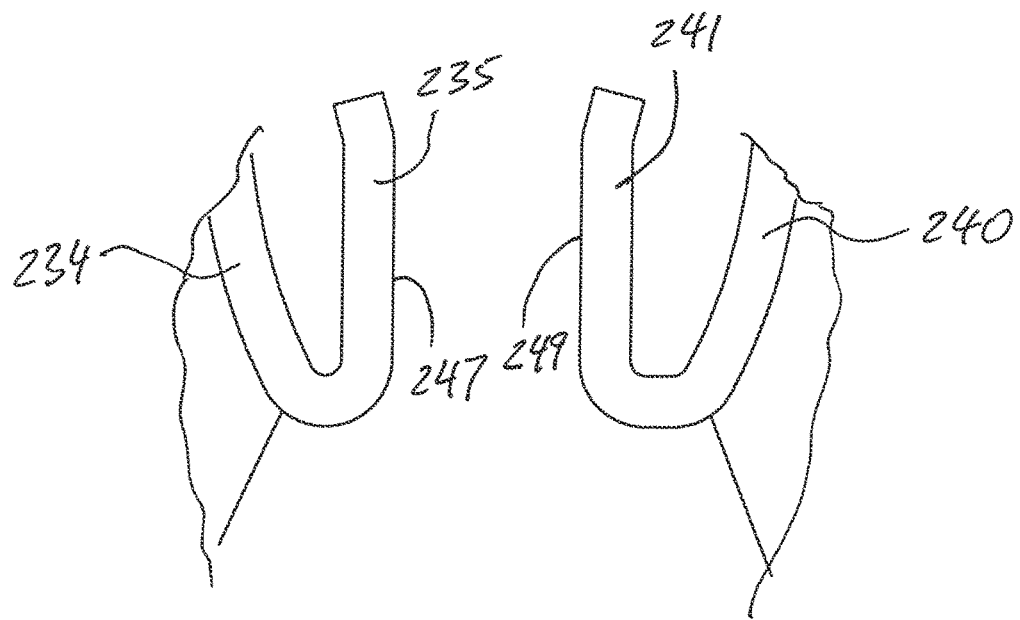
FIG. 22 is an enlarged view of a fragment of the hydrokinetic torque coupling device shown in the circle "21" of FIG. 15 showing radially inner peripheral ends of impeller and turbine core rings only.

A radially inner peripheral end of the impeller core ring 234 includes a substantially annular radial flange 235 having a substantially annular axially inner surface 247 adjacent to and facing the impeller side surface 269*i* of the stator flange 268 of the stator 248, as best shown in FIGS. 21 and 22. According to the third exemplary embodiment of the present invention illustrated in FIGS. 15 and 21, the axially inner surface 247 of the radial flange 235 of the impeller core ring 234 extends substantially parallel to the impeller side surface 269$i$ of the stator flange 268.

Similarly, a radially inner peripheral end of the turbine core ring 240 includes a substantially annular radial flange 241 having a substantially annular axially inner surface 249 adjacent to and facing the turbine side surface 269$t$ of the stator flange 268 of the stator 248, as best shown in FIGS. 21 and 22. According to the third exemplary embodiment of the present invention illustrated in FIGS. 15 and 21, the axially inner surface 249 of the radial flange 241 of the turbine core ring 240 extends substantially parallel to the turbine side surface 269$t$ of the stator flange 268. In other words, the stator flange 268 of the stator 248 is disposed between the radial flange 235 of the impeller core ring 234 and the radial flange 241 of the turbine core ring 240.

Figure 15:
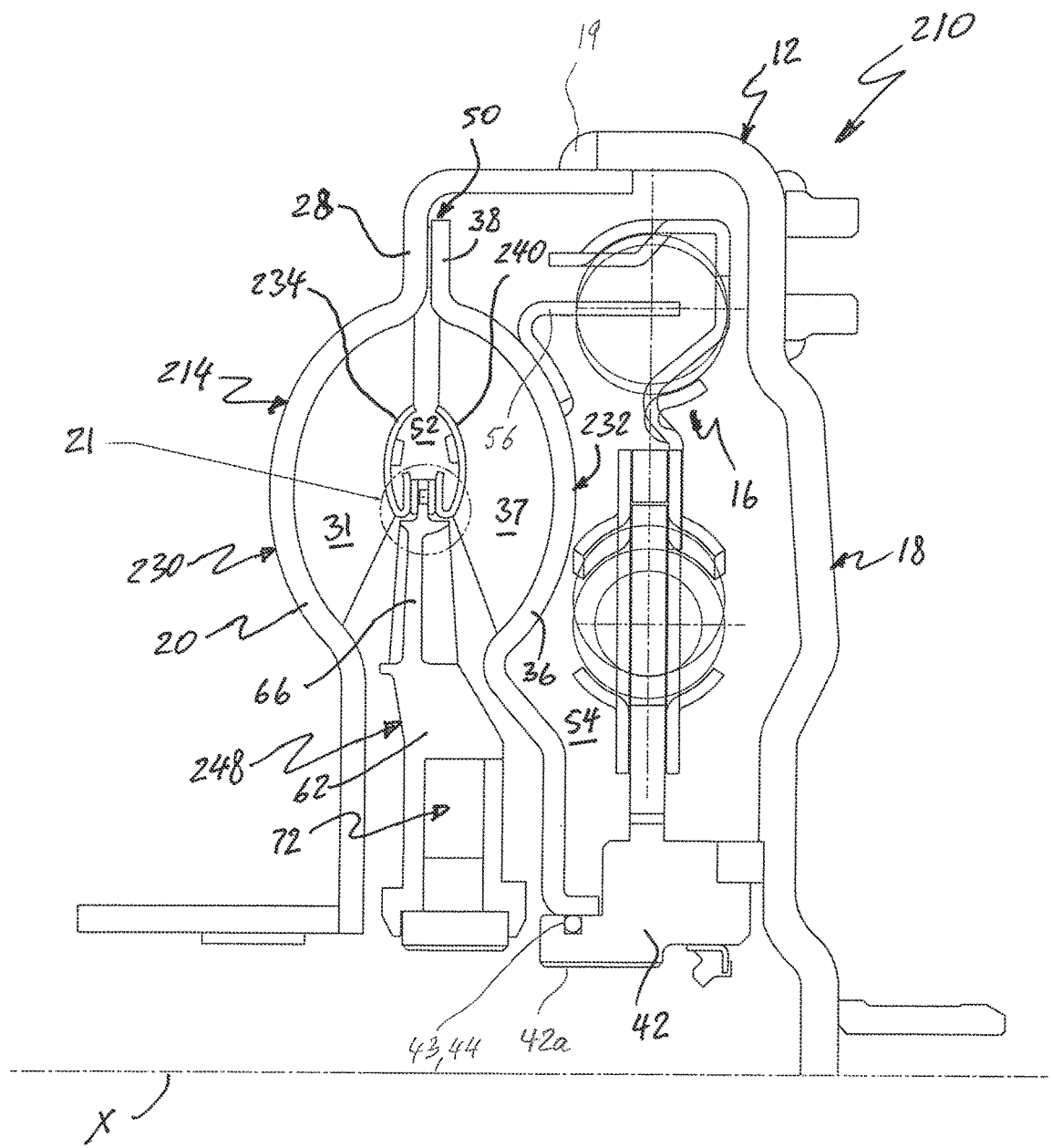
FIG. 15 is a fragmented half-view in axial section of a hydrokinetic torque coupling device in accordance with a third exemplary embodiment of the present invention.
Figure 16:
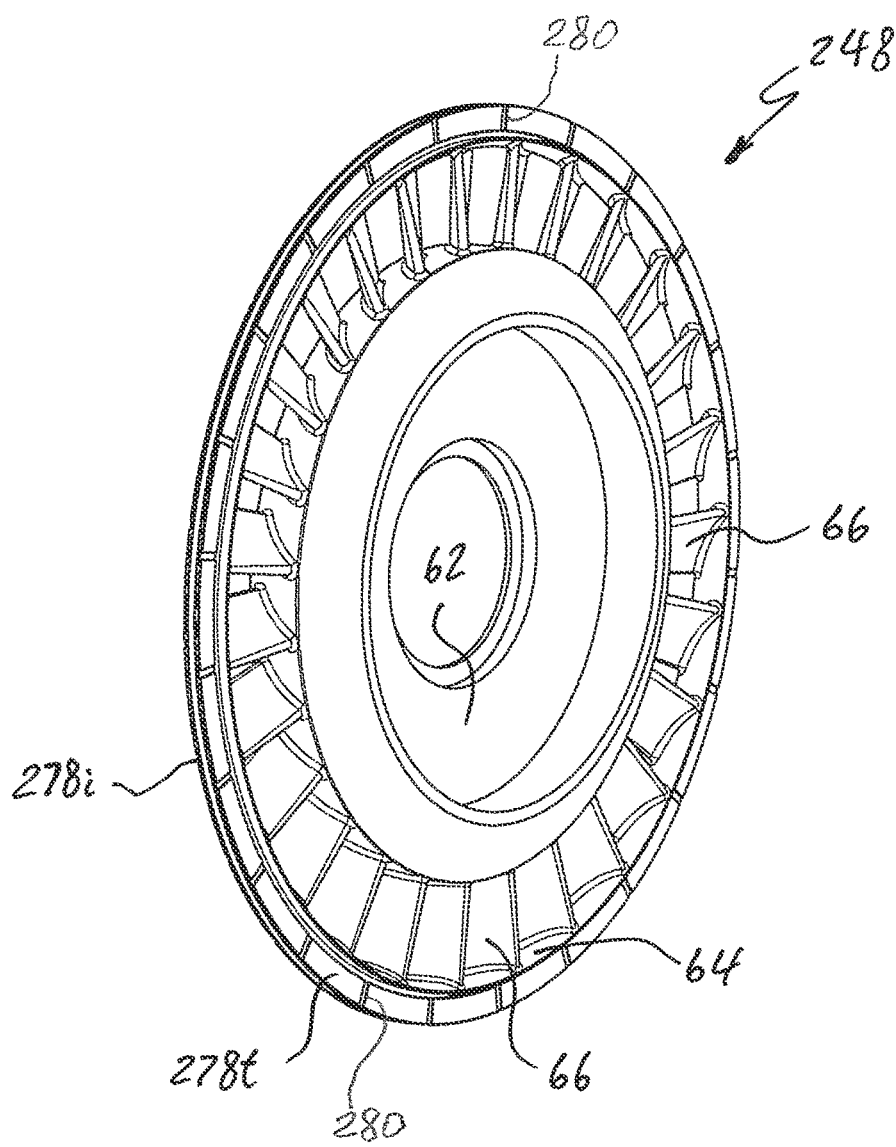
FIG. 16 is a perspective view of a stator of the hydrokinetic torque coupling device in accordance with the third exemplary embodiment of the present invention.
Figure 17:
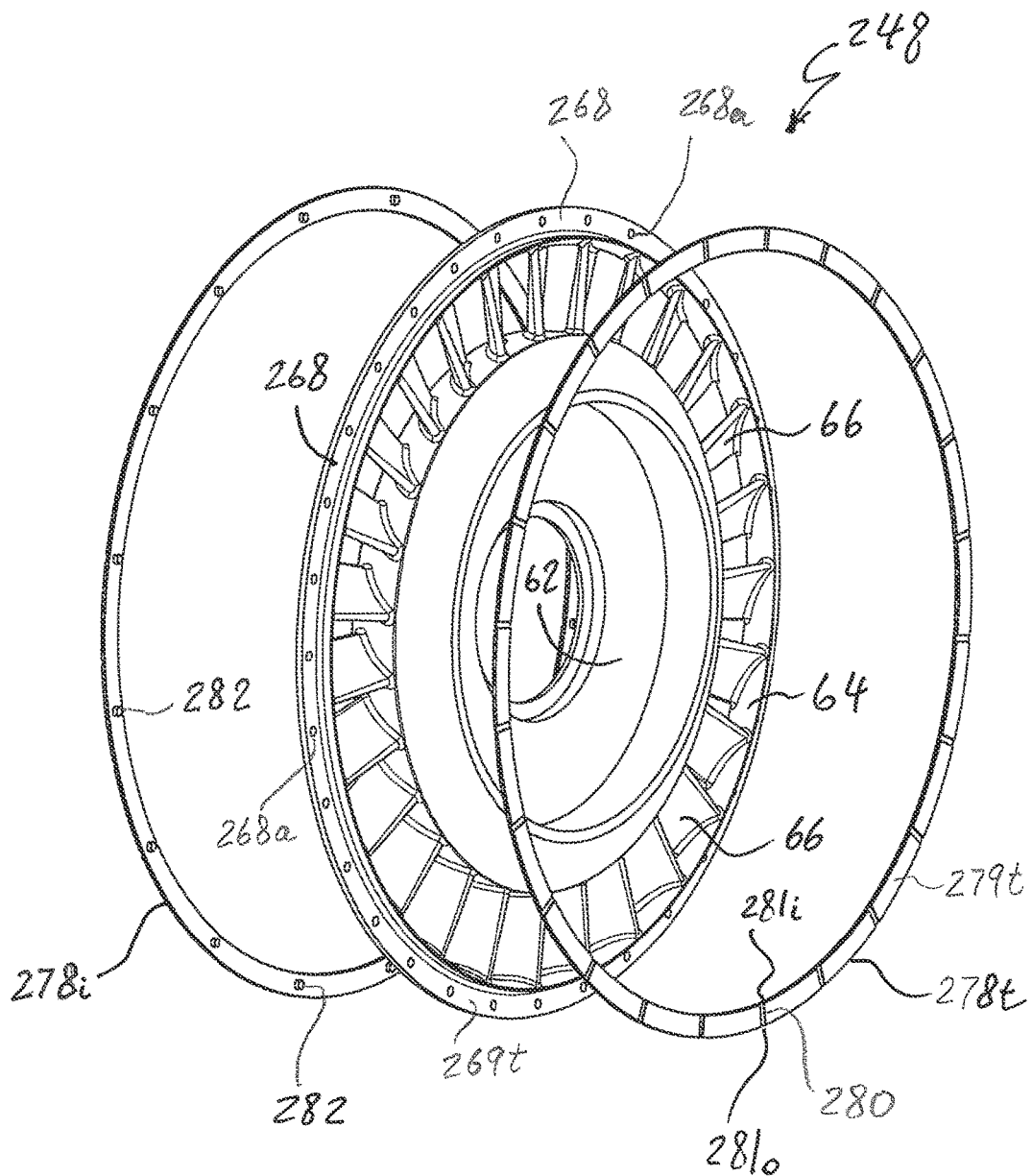
FIG. 17 is an exploded assembly view of the stator of the hydrokinetic torque coupling device in accordance with the third exemplary embodiment of the present invention.
Figure 18:
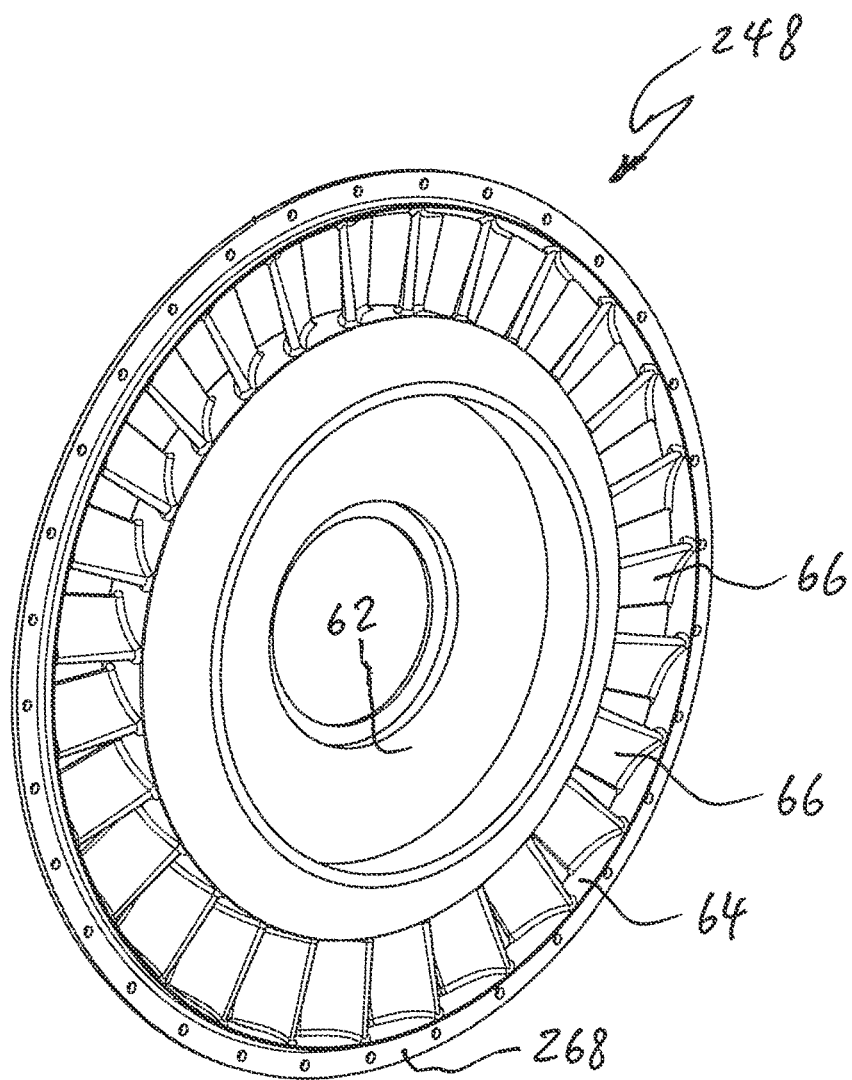
FIG. 18 is a perspective view of the stator of the hydrokinetic torque coupling device in accordance with the third exemplary embodiment of the present invention without thrust washers.
Figure 19:
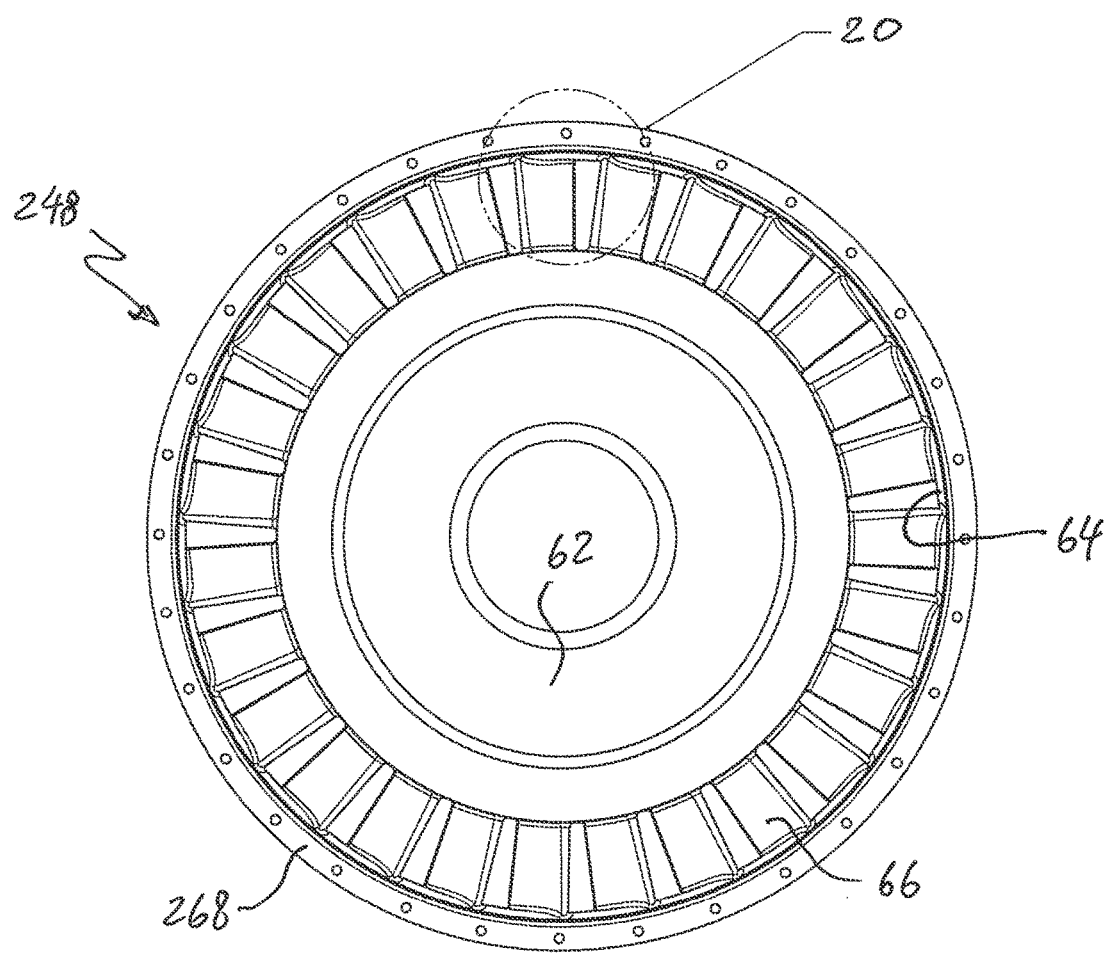
FIG. 19 is a side elevational view of the stator without the thrust washers in accordance with the third exemplary embodiment of the present invention.
Figure 20:
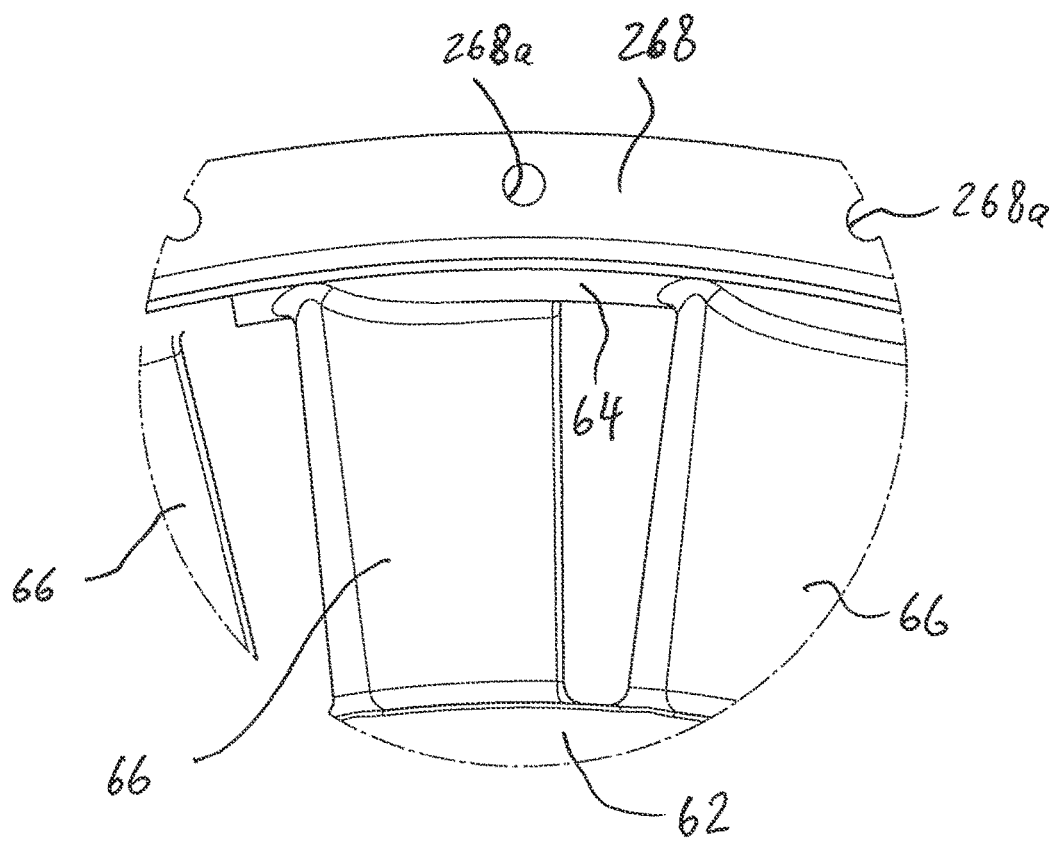
FIG. 20 is an enlarged view of a fragment of the hydrokinetic torque coupling device shown in the circle "20" of FIG. 19.
Figure 23:
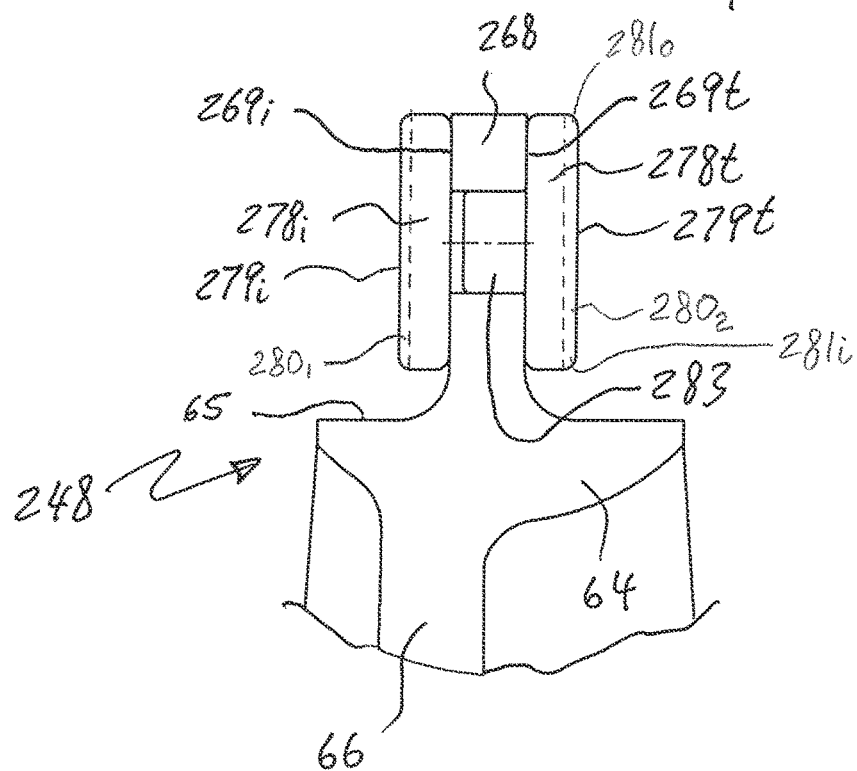
FIG. 23 is an enlarged view of a fragment of the hydrokinetic torque coupling device shown in the circle "21" of FIG. 15 showing radially outer end of the stator only.

According to the third exemplary embodiment of the present invention as illustrated in FIGS. 15-17, 21 and 23, the stator 248 further includes an annular impeller side thrust washer 278$i$ and an annular turbine side thrust washer 278$t$ oriented axially opposite to each other, as best shown in FIGS. 17, 21 and 23. The impeller side thrust washer 278$i$ is non-rotatably secured to the impeller side surface 269$i$ of the stator flange 268, while the turbine side thrust washer 278$t$ is non-rotatably secured to the turbine side surface 269$t$ of the stator flange 268. Specifically, the impeller side thrust washer 278$i$ is non-rotatably mounted to the impeller side surface 269$i$ of the stator flange 268 via a plurality of connecting pins 282 axially extending from an axially inner surface of the impeller side thrust washer 278$i$ (best shown in FIG. 17), and the turbine side thrust washer 278$t$ is non-rotatably mounted to the turbine side surface 269$t$ of the stator flange 268 via a plurality of connecting pins 283 axially extending from an axially inner surface of the turbine side thrust washer 278$t$ (best shown in FIG. 23). Moreover, the pins 282 and 283 are axially plugged into a plurality of corresponding pin holes 268$a$ formed axially through the stator flange 268.

As best shown in FIGS. 21 and 23, the impeller side thrust washer 278$i$ has an impeller side thrust surface 279$i$ facing the radial flange 235 of the impeller core ring 234, while the turbine side thrust washer 278$t$ has an turbine side thrust surface 279$t$ facing the radial flange 241 of the turbine core ring 240.

According to the third exemplary embodiment of the present invention illustrated in FIG. 21, the inner surface 247 of the radial flange 235 of the impeller core ring 234 is separated from the impeller side thrust surface 279$i$ of the impeller side thrust washer 278$i$ by an open annular gap 270$_1$ therebetween. Similarly, the inner surface 249 of the radial flange 241 of the turbine core ring 240 is separated from the turbine side thrust surface 279$t$ of the turbine side thrust washer 278$t$ by an open annular gap 170$_2$ therebetween. The annular gaps 270$_1$ and 270$_2$ are fluidly connected to the torus chamber 52 of the torque converter 214.

Further according to the third exemplary embodiment of the present invention as illustrated in FIGS. 16, 17, 21 and 23, a plurality of hydraulic pressure grooves 280 are integrally formed on the axially opposite sides of the impeller side thrust washer 278$i$ and the turbine side thrust washer 278$t$. The dynamic pressure grooves 280 are spaced circumferentially equidistantly from each other. In other words, the hydraulic pressure grooves 280 are radially formed at predetermined angular intervals in a circumferential direction of the stator 248. Specifically, the impeller side thrust surface 279$i$ of the impeller side thrust washer 278$i$ is integrally formed with hydraulic pressure grooves 280$_1$ facing the inner surface 247 of the radial flange 235 of the impeller core ring 234, and the turbine side thrust surface 279$t$ of the turbine side thrust washer 278$t$ is integrally formed with hydraulic pressure grooves 280$_2$ facing the inner surface 249 of the radial flange 241 of the turbine core ring 240. Alternatively, the hydraulic pressure grooves 280 may be formed only on the impeller side thrust washer 278$i$, or only on the turbine side thrust washer 278$t$.

Further alternatively, the stator 248 may comprise only one of the impeller and turbine side thrust washers integrally formed with the hydraulic pressure grooves 280

The hydraulic pressure grooves 280$_1$ and 280$_2$ are fluidly separated from each other and are referred to in general as "hydraulic pressure grooves 280". Each of the hydraulic pressure grooves 280 has two radial distal open ends. Specifically, each of the hydraulic pressure grooves 280 has a radial inner open end 281$i$ and a radial outer open end 281$o$, as best shown in FIGS. 17 and 23.

As further illustrated, the radial inner open end 281$i$ of each of the hydraulic pressure grooves 280 is radially spaced from a radially outer peripheral surface 65 (which is substantially cylindrical, according to the second exemplary embodiment of the present invention) of the outer rim 64 of the stator 248. Therefore, the hydraulic pressure grooves 280$_1$ and 280$_2$ are only formed on an entire radial width of the impeller and turbine side thrust surfaces 279$i$ and 279$t$, respectively, and have the opposite inner and outer open end 281$i$ and 281$o$, respectively. As a result, a backup hydraulic fluid pressure is created in the gaps 270$_1$ and 270$_2$, which function as a thrust bearing and ensures that mechanical friction between the impeller and turbine core rings 234, 240 and the stator 248 of the torque converter 214 during the rotation of the stator 248 and, accordingly, mechanical wear caused by the mechanical friction are minimized.

The stator 248 is rotatable in one direction only due to the one-way clutch 72. According to the second exemplary embodiment of the present invention, the hydraulic pressure grooves 280$_1$ and 280$_2$ formed on the impeller and turbine thrust washers 278$i$ and 278$t$, respectively, are straight (i.e., linear) and oriented substantially in the radial direction, as best illustrated in FIGS. 16 and 17 so that a hydrodynamic lift is generated within the annular gaps 270$_1$ and 270$_2$ between the impeller and turbine thrust washers 278$i$ and 278$t$ of the stator 248 and the radially inner peripheral end 235 of the impeller core ring 234 and the radially inner peripheral end 241 of the turbine core ring 240, respectively, during the rotation of the stator 248. Alternatively, the hydraulic pressure grooves 280$_1$ and 280$_2$ on the opposite impeller and turbine thrust washers 278$i$ and 278$t$ of the stator 248 may be slanted in the same or different directions relative to the radial direction on each of impeller and turbine thrust washers 278$i$ and 278$t$ of the stator 248. Further alternatively, the grooves may have any shape capable of generating a hydraulic fluid pressure, including a herringbone-like shape, triangular, wave-like shape, etc.

In operation, the hydraulic pressure grooves 280 are formed so that the resistance of the transmission fluid with respect to the relative rotation of the stator 248 is increased. Specifically, the hydraulic pressure grooves 280 are formed so that, during relative rotation of the stator 248, transmission fluid is introduced into the gaps 270$_1$ and 270$_2$ between the radially inner peripheral ends 235 and 241 of the impeller and the turbine core rings 234 and 240, respectively, and the impeller and turbine thrust washers 278$i$ and 278$t$ the stator 248. During relative rotation of the stator 248, a high pressure is generated in the gaps 270$_1$ and 270$_2$ between the stator 248 and the radially inner peripheral ends 235 and 241 of the impeller and turbine core rings 234 and 240, respectively. Consequently, the hydraulic pressure grooves $280_1$ and $280_2$ function as a thrust bearing. Therefore, mechanical (or solid, i.e., made of metal or plastic) thrust bearings, such as needle bearings, or thrust washers, which are typical in the conventional torque converters, are not required in the torque converter 214 according to the present invention.

An exemplary method for assembling the hydrokinetic torque coupling device 210 according to the third exemplary embodiment of FIGS. 15-23 will now be explained. It should be understood that alternative methods may be practiced within the scope of the invention.

The impeller 230, the turbine-piston 232, the stator 248, and the damper assembly 16 may each be preassembled. The turbine-piston 232 includes, as noted above, the turbine-piston shell 36, the turbine core ring 240, the turbine blades 37 extending between and attached to the turbine-piston shell 36 and the turbine core 240, and the turbine-piston flange 38.

The radially inner peripheral end 235 of the impeller core ring 234 includes the substantially annular radial flange 235 having the substantially annular axially inner surface 247. Similarly, the radially inner peripheral end 241 of the turbine core ring 240 includes the substantially annular radial flange 241 having the substantially annular axially inner surface 249. According to the third exemplary embodiment of the present invention illustrated in FIG. 21, both the radial flange 235 of the impeller core ring 234 and the radial flange 241 of the turbine core ring 240 extend substantially orthogonal to the rotational axis X.

The stator 248 includes the annular outer flange 268 extending radially outwardly from the outer rim 64. The outer flange 268 has an annular impeller side surface 269i and an annular turbine side surface 269t oriented axially opposite to each other. According to the third exemplary embodiment of the present invention illustrated in FIGS. 15 and 23, the axially opposite impeller side surface 269i and the turbine side surface 269t of the stator 248 are substantially orthogonal to the rotational axis X.

Then, the annular impeller and turbine side thrust washers 278i and 278t, respectively, are provided. The plurality of hydraulic pressure grooves 280 are formed on the thrust surfaces 279i and 279t of the impeller and turbine side thrust washers 278i and 278t, respectively, at predetermined angular intervals in the circumferential direction of the stator 248.

Next, the impeller side thrust washer 278i is non-rotatably mounted to the impeller side surface 269i of the stator flange 268 via the connecting pins 282, and the turbine side thrust washer 278t is non-rotatably mounted to the turbine side surface 269t of the stator flange 268 via the connecting pins 283, by axially plugging the pins 282 and 283 into the corresponding pin holes 268a formed axially through the stator flange 268.

The impeller 230, the stator 248, and the turbine-piston 232 subassemblies are assembled together as shown in the drawings so that the impeller and turbine side thrust washers 278i and 278t of the stator 248 are disposed axially between the radial flange 235 of the impeller core ring 234 of the impeller 230 and the radial flange 241 of the turbine core ring 240 of the turbine-piston 232.

The turbine-piston 232 is mounted to slidingly engage the output hub 42 (which is splined with or mounted on the driven shaft) with the seal 44 therebetween. The damper assembly 16 is added. The drive member 56 is engaged with the damper assembly 16. Then, the first casing shell 18 is non-moveably and sealingly secured, such as by welding at 19, to the second casing shell 20, as best shown in FIG. 15.

FIGS. 24-31 show a fourth exemplary embodiment of a hydrokinetic torque coupling device generally depicted with the reference numeral 310. The hydrokinetic torque coupling device 310 of the fourth exemplary embodiment illustrated in FIGS. 24-31, which corresponds substantially to the hydrokinetic torque coupling device 210 of the second exemplary embodiment of FIGS. 15-23, comprises a hydrokinetic torque converter 314 in a sealed casing 12 filled with a transmission fluid. The torque converter 314 includes an impeller 230, a turbine-piston 232, and a stator 348 interposed axially between the impeller 230 and the turbine-piston 232. The impeller 230 includes an impeller shell 20, a substantially annular impeller core ring 234 and a plurality of impeller blades 31, while the turbine-piston 232 includes a turbine-piston shell 36, a substantially annular turbine core ring 240, and a plurality of turbine blades 37.

The stator 348, according to the fourth exemplary embodiment of the present invention best illustrated in FIGS. 25-29 and 31, includes an annular stator hub 62, an annular radially outer rim 64 and a plurality of stator blades (or vanes) 66 radially outwardly extending between the stator hub 62 and the outer rim 64, and non-movably (i.e., fixedly) secured thereto. The stator 348 further includes an annular outer stator flange 268 extending radially outwardly from the outer rim 64. The outer stator flange 268 has an annular impeller side surface 269i and an annular turbine side surface 269t oriented axially opposite to each other.

According to the fourth exemplary embodiment of the present invention as illustrated in FIGS. 25, 26, 30 and 31, the stator 348 further includes an annular impeller side thrust washer 278i and an annular turbine side thrust washer 278t oriented axially opposite to each other, best shown in FIGS. 25, 26, 30 and 31. The impeller side thrust washer 278i is non-rotatably secured to the impeller side surface 269i of the stator flange 268, while the turbine side thrust washer 278t is non-rotatably secured to the turbine side surface 269t of the stator flange 268. Specifically, the impeller side thrust washer 278i is non-rotatably mounted to the impeller side surface 269i of the stator flange 268 via a plurality of connecting pins 282 axially extending from an axially inner surface of the impeller side thrust washer 278i (best shown in FIG. 26), and the turbine side thrust washer 278t is non-rotatably mounted to the turbine side surface 269t of the stator flange 268 via a plurality of connecting pins 283 axially extending from an axially inner surface of the turbine side thrust washer 278t (best shown in FIG. 31). Moreover, the pins 282 and 283 axially plugged into a plurality of corresponding pin holes 268a formed axially through the stator flange 268. At the same time, at least one of the impeller side thrust washer 278i and the turbine side thrust washer 278t is axially moveable relative to the stator flange 268.

Figure 30:
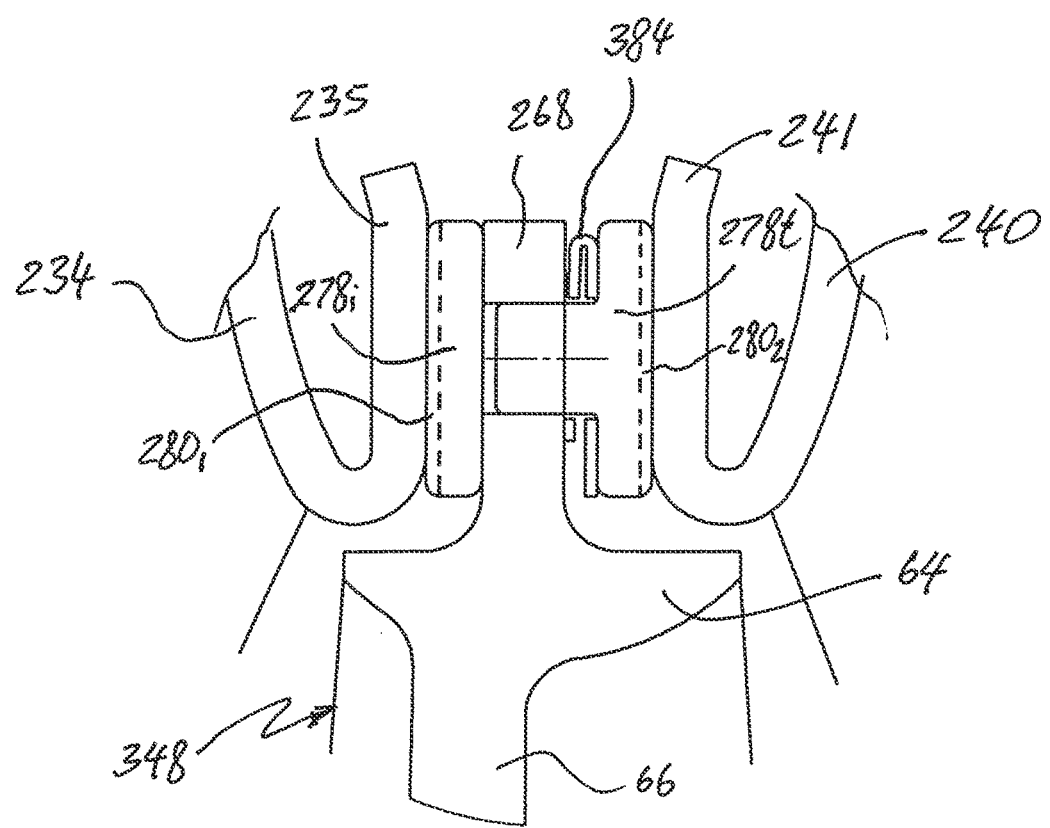
FIG. 30 is an enlarged view of a fragment of the hydrokinetic torque coupling device shown in the circle "30" of FIG. 24.
Figure 31:
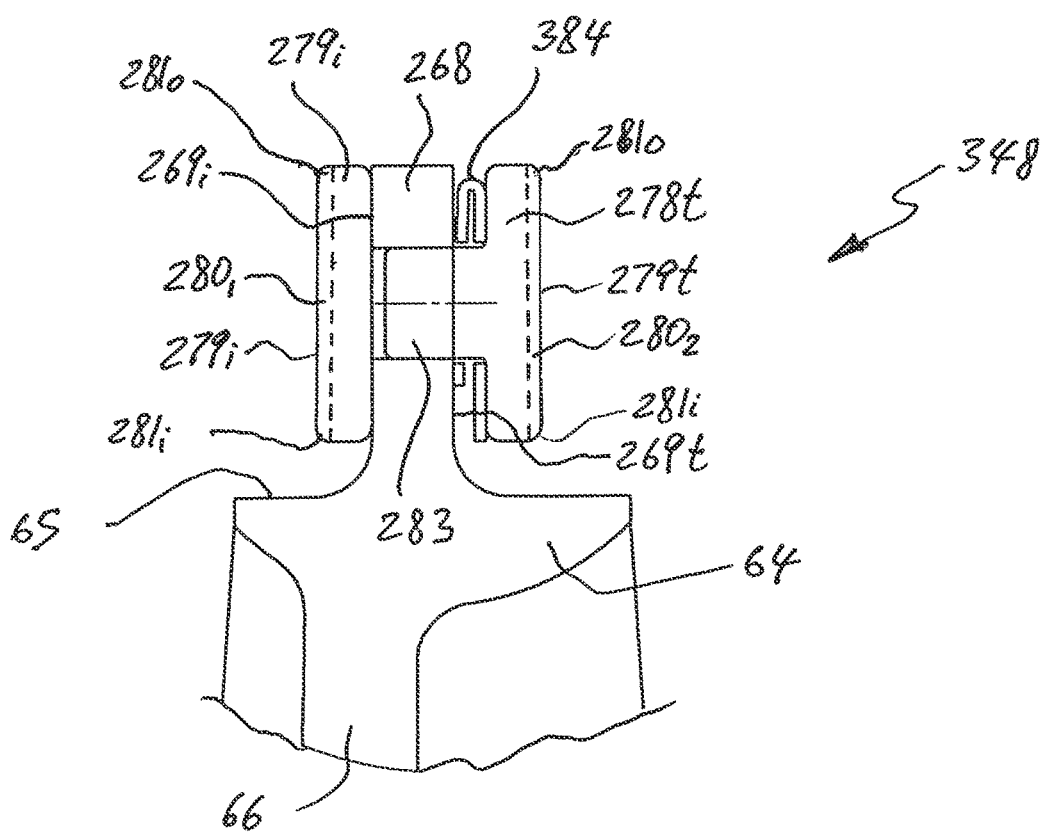
FIG. 31 is an enlarged view of a fragment of the hydrokinetic torque coupling device shown in the circle "30" of FIG. 24 showing radially outer end of the stator only.

As best shown in FIGS. 23, 30 and 31, the impeller side thrust washer 278i has an impeller side thrust surface 279i facing the radial flange 235 of the impeller core ring 234, while the turbine side thrust washer 278t has an turbine side thrust surface 279t facing the radial flange 241 of the turbine core ring 240. The axially inner surface of the impeller side thrust washer 278i is axially opposite to the impeller side thrust surface 279i thereof, and the axially inner surface of the turbine side thrust washer 278t is axially opposite to the turbine side thrust surface 279t thereof.

Figure 26:
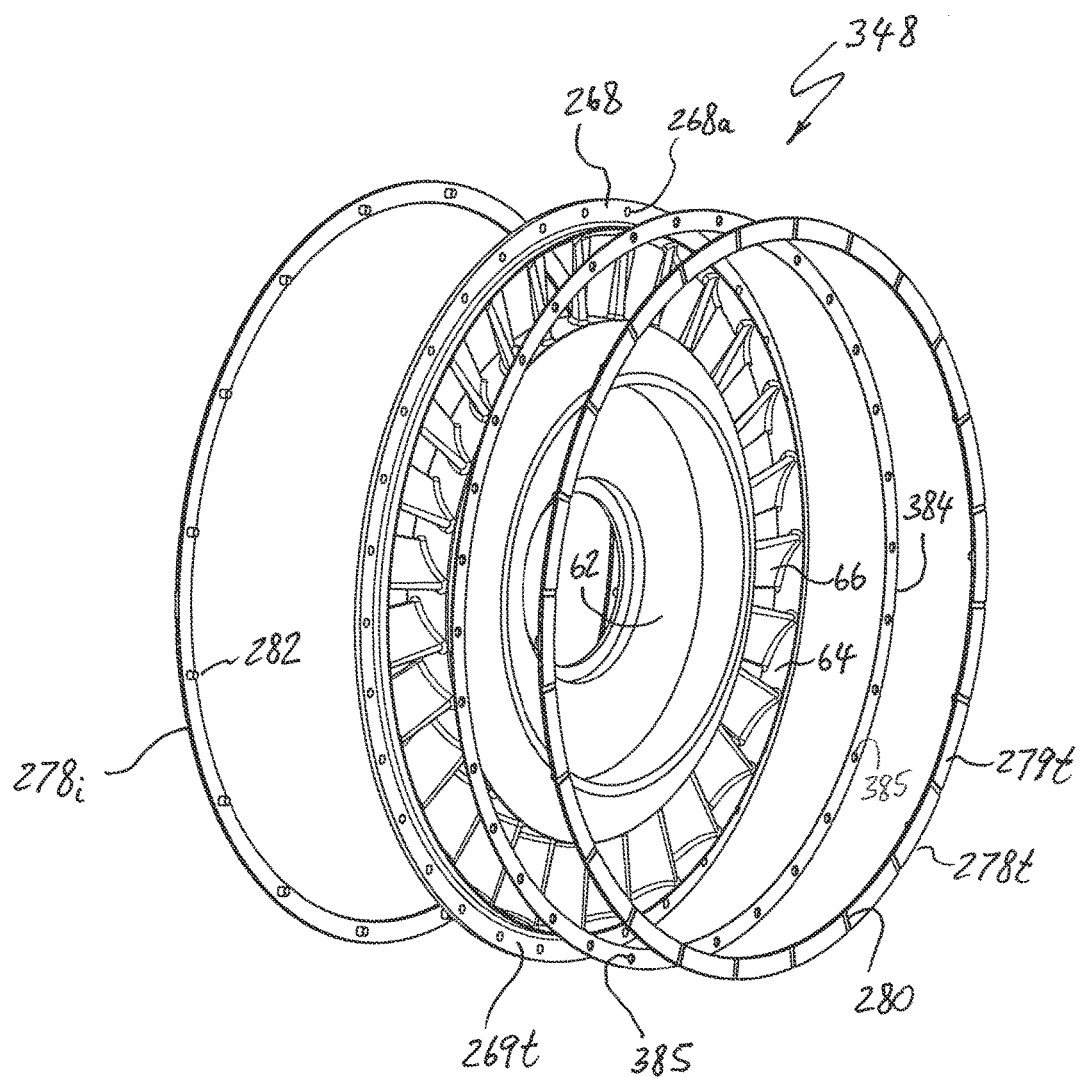
FIG. 26 is an exploded assembly view of the stator of the hydrokinetic torque coupling device in accordance with the fourth exemplary embodiment of the present invention.
Figure 27:
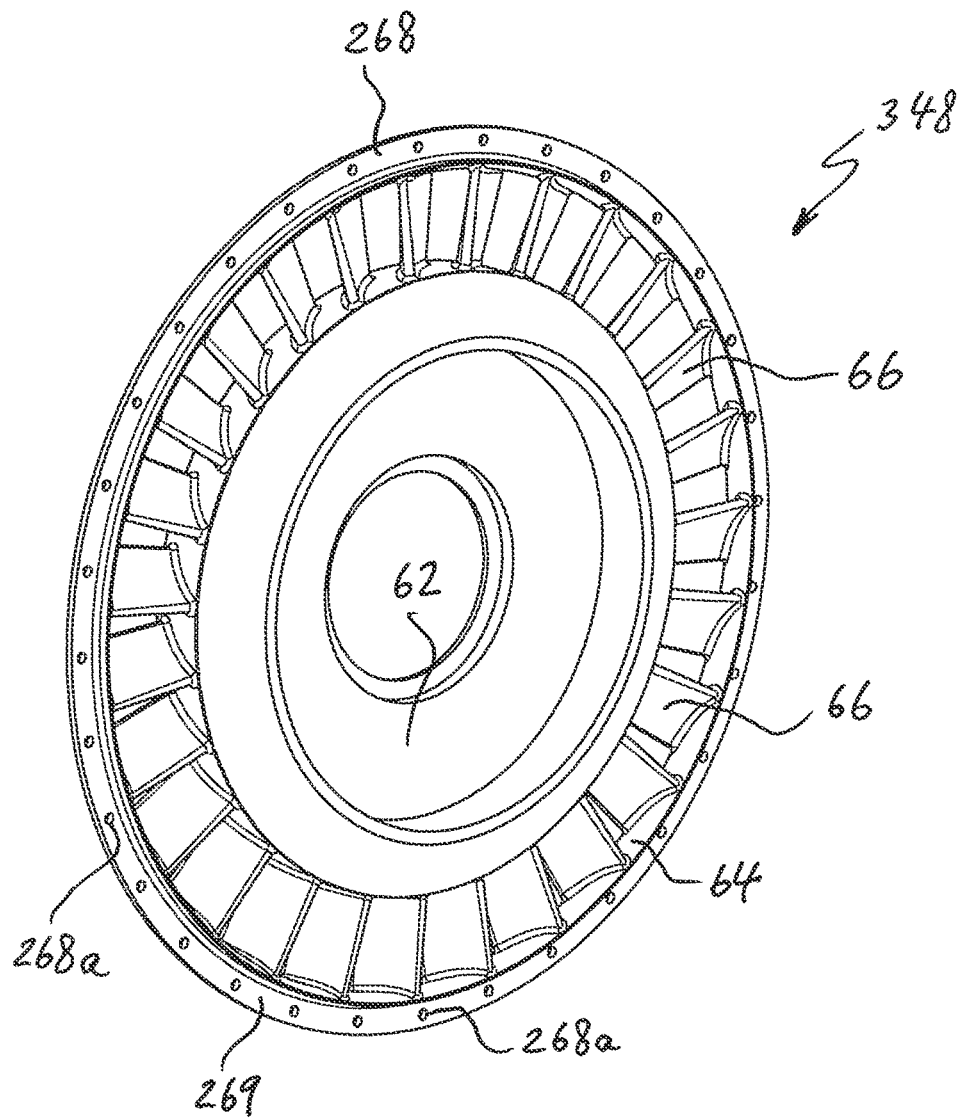
FIG. 27 is a perspective view of the stator of the hydrokinetic torque coupling device in accordance with the fourth exemplary embodiment of the present invention without thrust washers.
Figure 28:
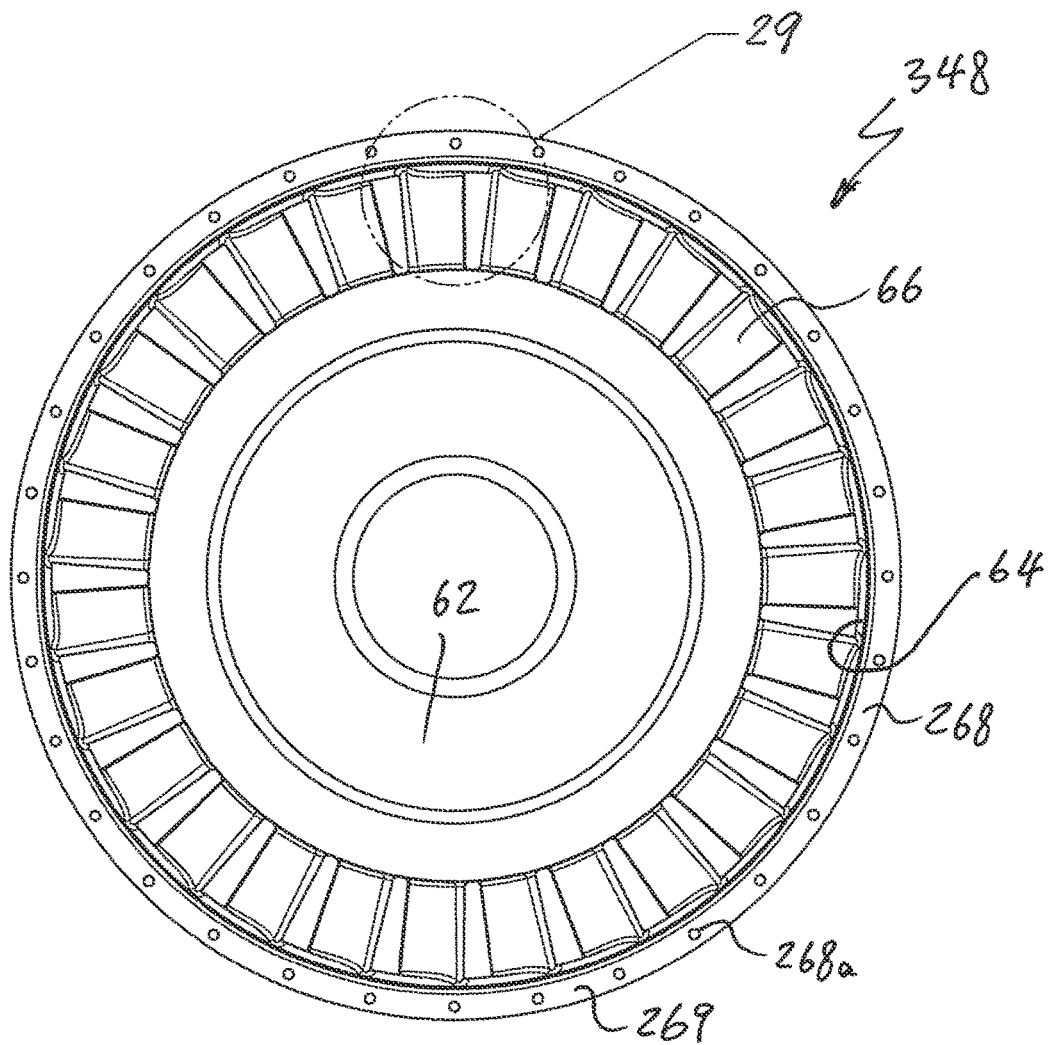
FIG. 28 is a side elevational view of the stator without the thrust washers in accordance with the fourth exemplary embodiment of the present invention.
Figure 29:
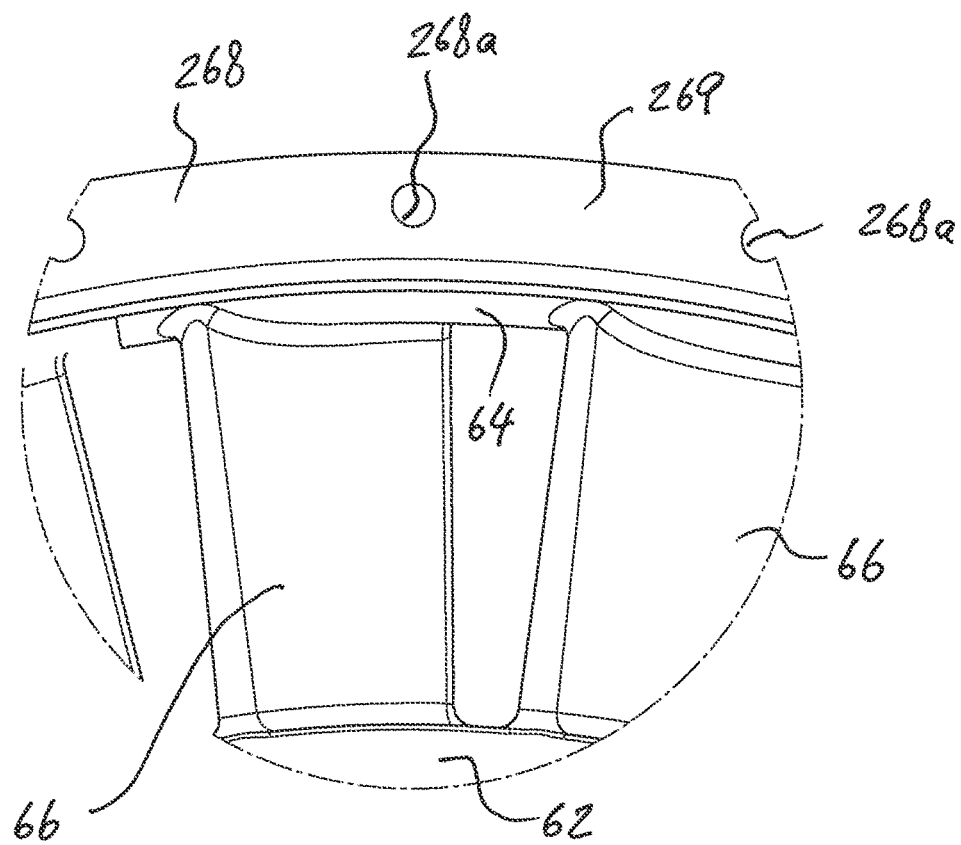
FIG. 29 is an enlarged view of a fragment of the hydrokinetic torque coupling device shown in the circle "29" of FIG. 28.

According to the fourth exemplary embodiment of the present invention as illustrated in FIGS. 25, 26, 30 and 31, the stator 348 further includes an annular, axially acting elastic (or resilient) washer 384 disposed between the turbine side surface 269t of the stator flange 268 and the axially inner surface of the turbine side thrust washer 278t. The elastic washer 384 is non-rotatably mounted to the stator flange 268 via a plurality of connecting pins 283 of the turbine side thrust washer 278t (as best shown in FIG. 31). The pins 283 are axially plugged into a plurality of corresponding pin holes 268a formed axially through the stator flange 268 so as to axially extend though a plurality of corresponding holes 385 formed axially through the elastic washer 384 (as best shown in FIG. 26).

The annular elastic washer 384 is provided to axially bias the turbine side thrust washer 278t toward the radial flange 241 of the turbine core ring 240. In other words, according to the fourth exemplary embodiment of the present invention, at least the turbine side thrust washer 278t is axially moveable relative to the stator flange 268. Alternatively, the elastic washer 384 may be disposed between the impeller side thrust washer 278i and the impeller side surface 269i of the stator flange 268. Further alternatively, the stator 348 may include two axially opposite elastic washers 384: one disposed between the impeller side thrust washer 278i and the impeller side surface 269i of the stator flange 268, and another disposed between the turbine side thrust washer 278t and the turbine side surface 269t of the stator flange 268.

According to the fourth exemplary embodiment of the present invention as illustrated in FIG. 30, the inner surface 247 of the radial flange 235 of the impeller core ring 234 is in rotationally sliding contact with the impeller side thrust surface 279i of the impeller side thrust washer 278i of the stator 348, while the inner surface 249 of the radial flange 241 of the turbine core ring 240 is in rotationally sliding contact with the turbine side thrust surface 279t of the turbine side thrust washer 278t due to the biasing force of the elastic washer 384 axially moving the turbine side thrust washer 278t relative to the stator flange 268 to contact with the radial flange 241 of the turbine core ring 240.

In operation, the hydraulic pressure grooves 280 are formed on the impeller and turbine side thrust washers 278i and 278t of the stator 348 so that the resistance of the transmission fluid with respect to the relative rotation of the stator 348 is increased. Specifically, the hydraulic pressure grooves 280 are formed so that, during relative rotation of the stator 248, the transmission fluid is introduced into the hydraulic pressure grooves 280 between the radially inner peripheral ends 235 and 241 of the impeller and the turbine core rings 234 and 240, respectively, and the impeller and turbine thrust washers 278i and 278t the stator 348. During relative rotation of the stator 348, a hydrodynamic film of high pressure fluid is generated between the stator 348 and the radially inner peripheral ends 235 and 241 of the impeller and turbine core rings 234 and 240, respectively. As a result, a hydrodynamic lift is generated between the impeller and turbine thrust washers 278i and 278t of the stator 248 and the radially inner peripheral end 235 of the impeller core ring 234 and the radially inner peripheral end 241 of the turbine core ring 240, respectively, during the rotation of the stator 248. Consequently, the hydraulic pressure grooves $280_1$ and $280_2$ function as a thrust bearing. Therefore, mechanical (or solid, i.e., made of metal or plastic) thrust bearings, such as needle bearings, or thrust washers, which are typical in the conventional torque converters, are not required in the torque converter 314 according to the present invention.

Described below is an exemplary method whereby the hydrokinetic torque coupling device 310 according to the fourth exemplary embodiment of the present invention is assembled. It should be understood that alternative methods may be practiced within the scope of the invention.

The impeller 230, the turbine-piston 232, the stator 348, and the damper assembly 16 may each be preassembled. The stator 348 includes the annular outer flange 268 extending radially outwardly from the outer rim 64. The outer flange 268 has an annular impeller side surface 269i and an annular turbine side surface 269t oriented axially opposite to each other. According to the fourth exemplary embodiment of the present invention illustrated in FIGS. 24 and 31, the axially opposite impeller side surface 269i and the turbine side surface 269t of the stator 348 are substantially orthogonal to the rotational axis X.

Then, the annular impeller and turbine side thrust washers 278i and 278t, respectively, and the annular, axially acting elastic washer 384 are provided. The plurality of hydraulic pressure grooves 280 are formed on the thrust surfaces 279i and 279t of the impeller and turbine side thrust washers 278i and 278t, respectively, at predetermined angular intervals in the circumferential direction of the stator 248.

Next, the impeller side thrust washer 278i is non-rotatably mounted to the impeller side surface 269i of the stator flange 268 via the connecting pins 282, and the turbine side thrust washer 278t and the elastic washer 384 are non-rotatably mounted to the turbine side surface 269t of the stator flange 268 via the connecting pins 283, by axially plugging the pins 282 and 283 into the corresponding pin holes 268a formed axially through the stator flange 268 and the corresponding holes 385 formed axially through the elastic washer 384. More specifically, the elastic washer 384 is non-rotatably mounted to the stator flange 268 so as to be disposed between the turbine side surface 269t of the stator flange 268 and the axially inner surface of the turbine side thrust washer 278t.

The impeller 230, the stator 348, and the turbine-piston 232 subassemblies are assembled together as shown in the drawings so that the impeller and turbine side thrust washers 278i and 278t, and the elastic washer 384 of the stator 348 are disposed axially between the radial flange 235 of the impeller core ring 234 of the impeller 230 and the radial flange 241 of the turbine core ring 240 of the turbine-piston 232.

Figure 24:
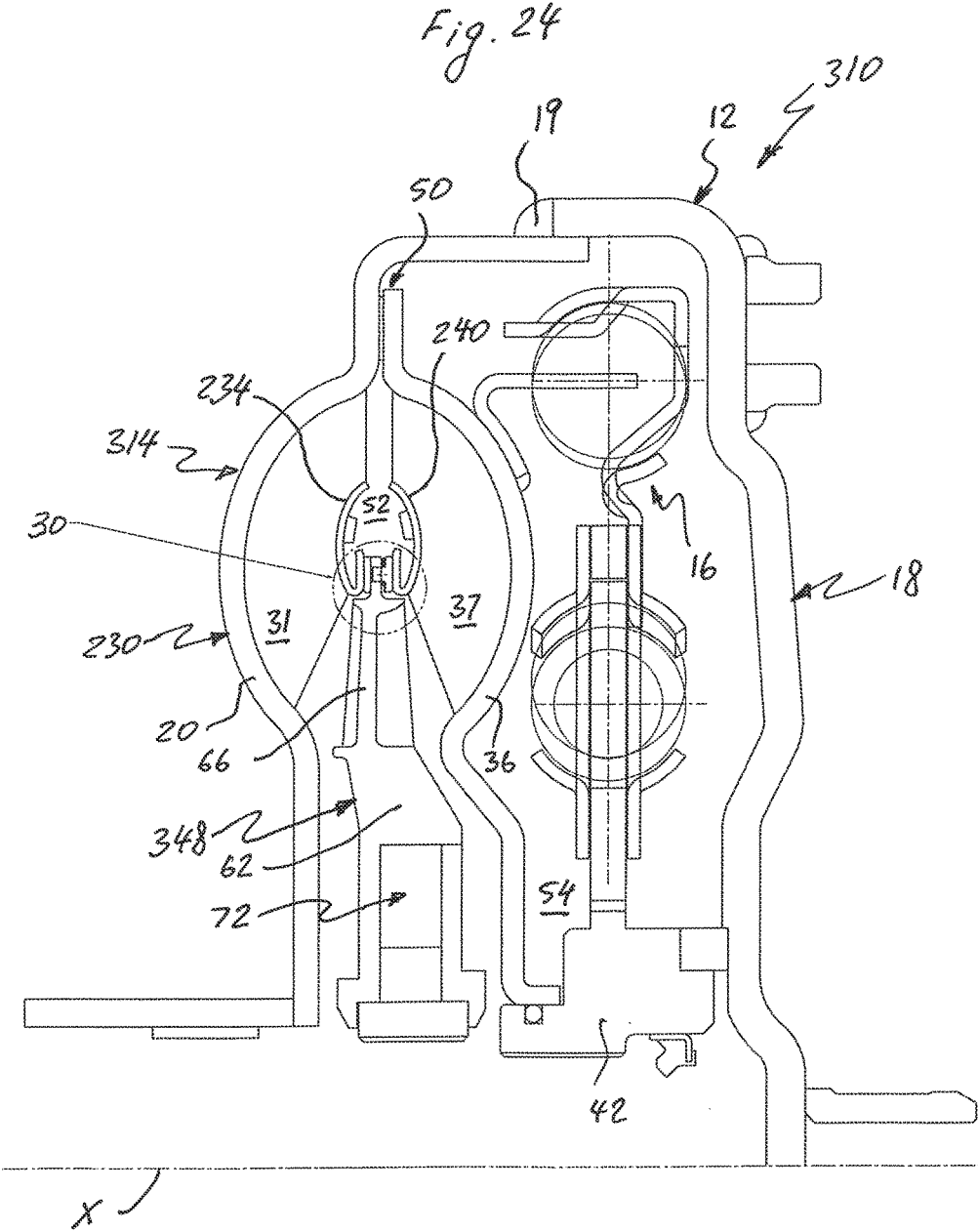
FIG. 24 is a fragmented half-view in axial section of a hydrokinetic torque coupling device in accordance with a fourth exemplary embodiment of the present invention.
Figure 25:
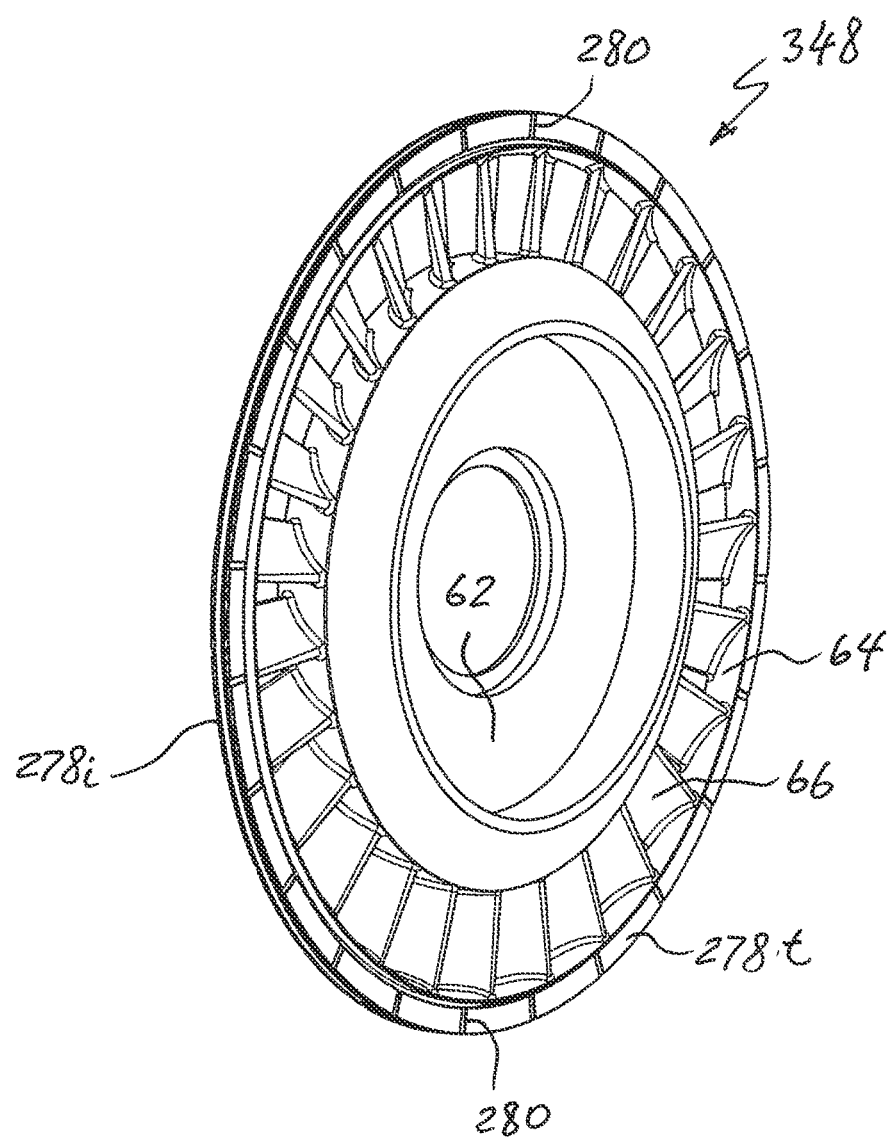
FIG. 25 is a perspective view of a stator of the hydrokinetic torque coupling device in accordance with the fourth exemplary embodiment of the present invention.

The turbine-piston 232 is mounted to slidingly engage the output hub 42 (which is splined with or mounted on the driven shaft) with the seal 44 therebetween. The damper assembly 16 is added. The drive member 56 is engaged with the damper assembly 16. Then, the first casing shell 18 is non-moveably and sealingly secured, such as by welding at 19, to the second casing shell 20, as best shown in FIG. 24.

Therefore, the present invention provides a novel hydrokinetic torque converter and method for assembling thereof that simplifies and optimizes the assembly process, and makes it cost effective. Moreover, the present invention proposes a direct hydrodynamic axial thrust between turbine, stator and impeller that excludes mechanical wear caused by the mechanical friction and does not require mechanical thrust bearings, such as needle bearings, or thrust washers, which are typical in the conventional torque converters.

The foregoing description of the exemplary embodiment (s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A hydrokinetic torque converter, comprising:
   an impeller rotatable about a rotational axis, the impeller including a impeller shell, an impeller core ring and a plurality of impeller blades disposed between the impeller shell and the impeller core ring; and
   a turbine rotatable about the rotational axis and disposed axially opposite to the impeller, the turbine coaxially aligned with and hydrodynamically drivable by the impeller, the turbine including a turbine shell, a turbine core ring and a plurality of turbine blades disposed between the turbine shell and the turbine core ring; and
   a stator disposed between the impeller and the turbine, the stator including:
      an annular stator hub, an annular radially outer stator rim and a plurality of stator blades radially outwardly extending between the stator hub and the outer stator rim;
      an annular outer stator flange extending radially outwardly from the outer stator rim thereof and disposed between the impeller core ring and the turbine core ring, the outer stator flange having an annular impeller side surface facing the impeller core rings and an annular turbine side surface oriented axially opposite to the impeller side surface of the outer stator flange and facing the turbine core ring; and
      a plurality of hydraulic pressure grooves provided on at least one of the impeller and turbine side surfaces of the outer stator flange, the hydraulic pressure grooves facing at least one of the impeller and turbine core rings so as to create a hydrodynamic lift between the stator and at least one of the impeller and turbine core rings in the axial direction.

2. The torque converter as defined in claim 1, wherein the outer flange of the stator is disposed between a radially inner peripheral end of the impeller core ring and a radially inner peripheral end of the turbine core ring; and wherein each of the radially inner peripheral ends of the impeller and turbine core rings faces one of axially opposite annular impeller and turbine side surfaces of the outer flange of the stator.

3. The torque converter as defined in claim 2, wherein the hydraulic pressure grooves are formed on the at least one of the impeller and turbine side surfaces of the outer stator flange.

4. The torque converter as defined in claim 3, wherein the hydraulic pressure grooves are formed on both the axially opposite impeller and turbine side surfaces of the outer stator flange.

5. The torque converter as defined in claim 2, further comprising at least one of an annular impeller side thrust washer and an annular turbine side thrust washer; wherein the impeller side thrust washer is non-rotatably secured to the impeller side surface of the stator flange; and wherein the turbine side thrust washer is non-rotatably secured to the turbine side surface of the stator flange.

6. The torque converter as defined in claim 5, wherein the hydraulic pressure grooves are formed on the at least one of the impeller and turbine side thrust washers of the stator.

7. The torque converter as defined in claim 5, comprising both the impeller side thrust washer and the turbine side thrust washer oriented axially opposite to each other; and wherein the impeller side thrust washer is non-rotatably secured to the impeller side surface of the stator flange and the turbine side thrust washer is non-rotatably secured to the turbine side surface of the stator flange.

8. The torque converter as defined in claim 7, wherein the hydraulic pressure grooves are formed on both the impeller and turbine side thrust washers of the stator.

9. The torque converter as defined in claim 7, further comprising an annular, axially acting resilient washer disposed between the stator flange and the turbine side thrust washer or between the impeller side surface of the stator flange and the impeller side thrust washer.

10. The torque converter as defined in claim 9, wherein the washer is disposed between the stator flange and the turbine side thrust washer and is provided to axially bias the turbine side thrust washer toward the turbine core ring.

11. The torque converter as defined in claim 10, wherein the washer is non-rotatably mounted to the stator flange.

12. The torque converter as defined in claim 1, wherein each of the hydraulic pressure grooves has a radial inner closed end.

13. The torque converter as defined in claim 12, wherein each of the hydraulic pressure grooves further has a radial outer closed end.

14. The torque converter as defined in claim 1, wherein each of the hydraulic pressure grooves has a radial outer open end.

15. The torque converter as defined in claim 14, wherein each of the hydraulic pressure grooves further has a radial inner open end.

16. The torque converter as defined in claim 1, wherein an annular gap is provided between at least one of the impeller and turbine core rings and at least one of the outer side surfaces of the outer stator flange facing the at least one of the impeller and turbine core rings.

17. The torque converter as defined in claim 16, wherein the annular gap is provided between both the impeller core ring and the impeller side surface of the outer stator flange and between the turbine core rings and the turbine side surface of the outer stator flange; and
   wherein the hydraulic pressure grooves are provided on both the impeller and turbine side surfaces of the outer flange of the stator so as to create a thrust bearing effect between the stator and both the impeller and turbine core rings.

18. The torque converter as defined in claim 1, wherein the turbine comprises a turbine-piston shell including a turbine-piston flange, the turbine is movable axially toward and away from the impeller to position the torque converter into and out of a lockup mode in which the turbine-piston is mechanically locked to the impeller so as to be non-rotatable relative to the impeller.

19. A hydrokinetic torque coupling device for coupling together a driving shaft and a driven shaft, the hydrokinetic torque coupling device being rotatable about a rotational axis and comprising:
   a casing being rotatable about the rotational axis and comprising an impeller shell and a casing shell connected to and non-rotatable relative to the impeller shell; and a torque converter coaxially aligned with and rotatable about the rotational axis, the torque converter comprising:
  an impeller rotatable about a rotational axis, the impeller including a impeller shell, an impeller core ring and a plurality of impeller blades disposed between the impeller shell and the impeller core ring;
  a turbine rotatable about the rotational axis and disposed axially opposite to the impeller, the turbine coaxially aligned with and hydrodynamically drivable by the impeller, the turbine including a turbine shell, a turbine core ring and a plurality of turbine blades disposed between the turbine shell and the turbine core ring; and
  a stator disposed between the impeller and the turbine, the stator including:
  an annular stator hub, an annular radially outer stator rim and a plurality of stator blades radially outwardly extending between the stator hub and the outer stator rim;
  an annular outer stator flange extending radially outwardly from the outer stator rim and disposed between the impeller core ring and the turbine core ring, the outer stator flange having an annular impeller side surface facing the impeller core rings and an annular turbine side surface oriented axially opposite to the impeller side surface of the outer stator flange and facing the turbine core ring; and
  a plurality of hydraulic pressure grooves provided on at least one of the impeller and turbine side surfaces of the outer stator flange, the hydraulic pressure grooves facing at least one of the impeller and turbine core rings so as to create a hydrodynamic lift between the stator and at least one of the impeller and turbine core rings in the axial direction.

20. A method of assembling a hydrokinetic torque converter, the method comprising the steps of:
  providing an impeller including a impeller shell, an impeller core ring and a plurality of impeller blades disposed between the impeller shell and the impeller core ring;
  providing a turbine including a turbine shell, a turbine core ring and a plurality of turbine blades disposed between the turbine shell and the turbine core ring;
  providing a stator including:
    an annular stator hub, an annular radially outer stator rim and a plurality of stator blades radially outwardly extending between the stator hub and the outer stator rim;
    an annular outer stator flange extending radially outwardly from the outer stator rim, the outer stator flange having an annular impeller side surface an annular turbine side surface oriented axially opposite to the impeller side surface of the outer stator flange; and
    a plurality of hydraulic pressure grooves provided on at least one of the impeller and turbine side surfaces of the outer stator flange; and
  mounting the impeller, the stator and the turbine coaxially aligned together so that the outer stator flange disposed between the impeller core ring and the turbine core ring and so that the hydraulic pressure grooves facing at least one of the impeller and turbine core rings so as to create a hydrodynamic lift between the stator and at least one of the impeller and turbine core rings in the axial direction.

* * * * *